US012075063B2

(12) United States Patent
Xu et al.

(10) Patent No.: US 12,075,063 B2
(45) Date of Patent: *Aug. 27, 2024

(54) UNIFIED VECTOR AND OFFSET SIGNALING FOR INTER PREDICTION AND INTRA BLOCK COPY

(71) Applicant: TENCENT AMERICA LLC, Palo Alto, CA (US)

(72) Inventors: Xiaozhong Xu, State College, PA (US); Shan Liu, San Jose, CA (US); Xiang Li, Saratoga, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/348,986

(22) Filed: Jul. 7, 2023

(65) Prior Publication Data

US 2023/0353756 A1    Nov. 2, 2023

Related U.S. Application Data

(63) Continuation of application No. 17/697,599, filed on Mar. 17, 2022, now Pat. No. 11,758,154, which is a continuation of application No. 16/554,391, filed on Aug. 28, 2019, now Pat. No. 11,317,099.

(60) Provisional application No. 62/785,047, filed on Dec. 26, 2018, provisional application No. 62/742,040, filed on Oct. 5, 2018.

(51) Int. Cl.
*H04N 19/52* (2014.01)
*H04N 19/105* (2014.01)
*H04N 19/107* (2014.01)
*H04N 19/159* (2014.01)
*H04N 19/176* (2014.01)

(52) U.S. Cl.
CPC ......... *H04N 19/159* (2014.11); *H04N 19/105* (2014.11); *H04N 19/107* (2014.11); *H04N 19/176* (2014.11); *H04N 19/52* (2014.11)

(58) Field of Classification Search
CPC ............... H04N 19/159; H04N 19/105; H04N 19/107; H04N 19/176; H04N 19/52
USPC .................................................... 375/240.16
See application file for complete search history.

(56) References Cited

U.S. PATENT DOCUMENTS

2016/0100189 A1 *   4/2016   Pang ................. H04N 19/593
                                                               375/240.13
2020/0107043 A1 *   4/2020   Hung ................. H04N 19/56

* cited by examiner

*Primary Examiner* — Ayman A Abaza
(74) *Attorney, Agent, or Firm* — ARENTFOX SCHIFF LLP

(57) ABSTRACT

Aspects of the disclosure provide a method and an apparatus including processing circuitry for video decoding. The processing circuitry decodes prediction information of a current block in a current picture from a coded video bitstream. The prediction information indicates a prediction mode for the current block being an inter prediction mode or an intra block copy (IBC) mode. The processing circuitry selects a base vector from a candidate list including a block vector candidate used in the IBC mode and determines an offset vector based on offset information that includes directions and sizes for constructing offset vectors. The processing circuitry determines a vector of the current block based on the base vector and the offset vector. The vector is a block vector when the prediction mode is the IBC mode and the vector is a motion vector when the prediction mode is the inter prediction mode.

20 Claims, 14 Drawing Sheets

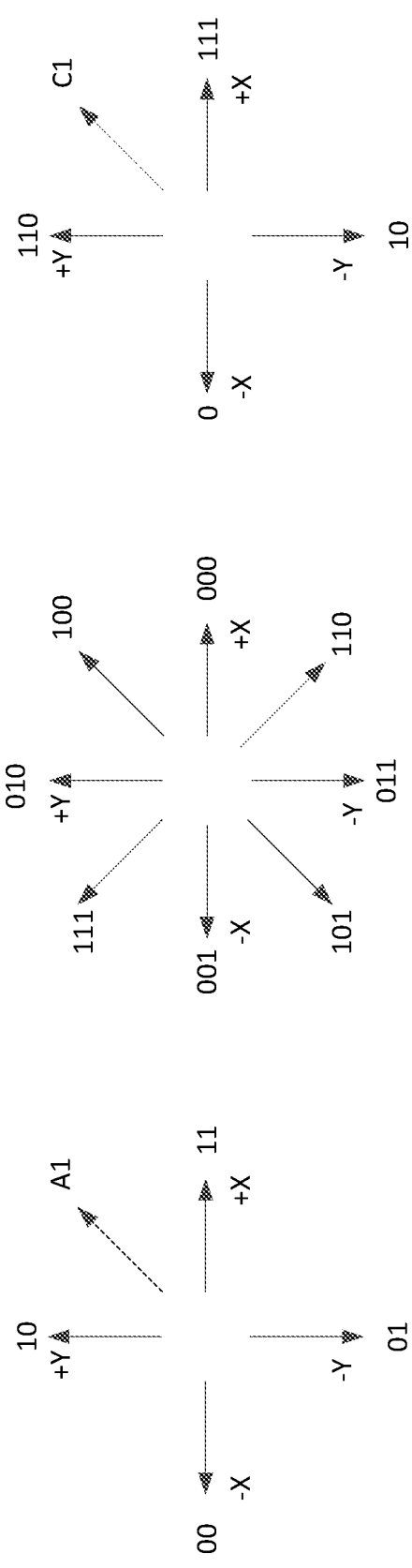
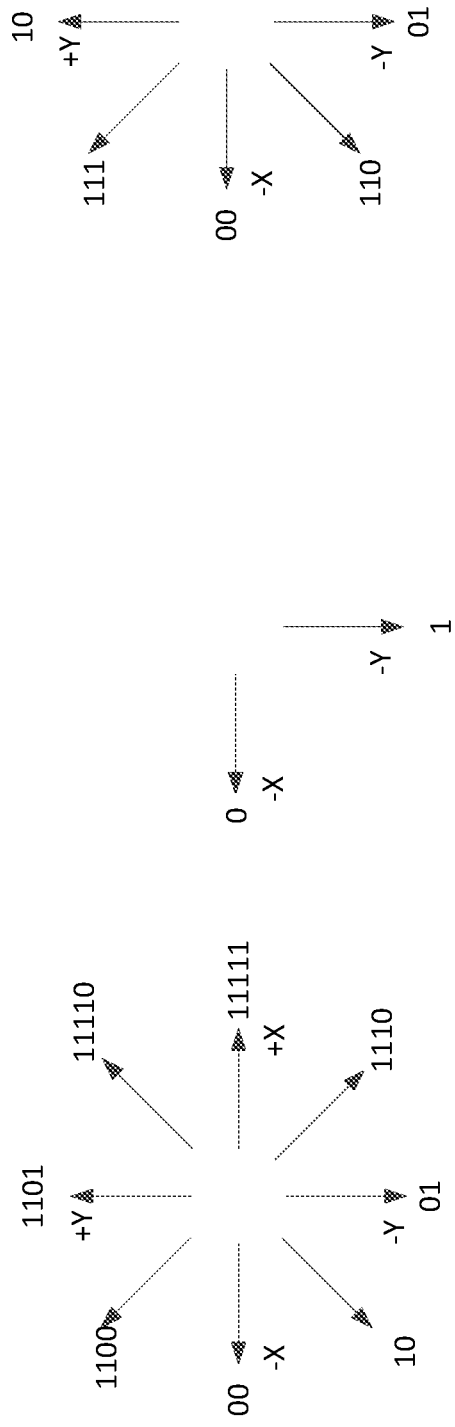
FIG. 11A FIG. 11B FIG. 11C FIG. 11D FIG. 11E FIG. 11F

UNIFIED VECTOR AND OFFSET SIGNALING FOR INTER PREDICTION AND INTRA BLOCK COPY

INCORPORATION BY REFERENCE

This application is a continuation of U.S. application Ser. No. 17/697,599, "METHOD AND APPARATUS FOR SIGNALING AN OFFSET IN VIDEO CODING FOR INTRA BLOCK COPY AND/OR INTER PREDICTION" filed on Mar. 17, 2022, which is a continuation of U.S. application Ser. No. 16/554,391, "METHOD AND APPARATUS FOR SIGNALING AN OFFSET IN VIDEO CODING FOR INTRA BLOCK COPY AND/OR INTER PREDICTION" filed on Aug. 28, 2019, now U.S. Pat. No. 11,317,099, which claims the benefit of priority to U.S. Provisional Application No. 62/742,040, "BLOCK VECTOR PREDICTION WITH SIGNALED OFFSETS IN INTRA BLOCK COPY" filed on Oct. 5, 2018, and U.S. Provisional Application No. 62/785,047, "BLOCK VECTOR CLIPPING FOR INTRA BLOCK COPY" filed on Dec. 26, 2018, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry decodes prediction information of a current block in a current picture from a coded video bitstream. The prediction information indicates that a prediction mode for reconstructing the current block is one of: an inter prediction mode and an intra block copy (IBC)

mode. The processing circuitry selects a base vector from a candidate list including a block vector candidate used in the IBC mode and determines an offset vector based on offset information that includes directions and sizes for constructing offset vectors. The processing circuitry determines a vector of the current block based on the base vector and the offset vector. The vector of the current block indicates a reference block of the current block. The reference block is in the current picture and the vector of the current block is a block vector when the prediction mode is the IBC mode. The reference block is in a reference picture and the vector of the current block is a motion vector when the prediction mode is the inter prediction mode. The processing circuitry reconstructs at least one sample in the current block based on the vector of the current block.

In an embodiment, the prediction mode is the IBC mode and the vector of the current block is the block vector. In an example, the prediction information includes a base index that points to the block vector candidate. The candidate list has a plurality of candidates that includes the block vector candidate. The processing circuitry determines the base vector to be the block vector candidate based on the base index.

In an example, the offset information includes a set of offset directions and a set of step sizes. The prediction information includes an offset direction index and a distance index. The processing circuitry determines an offset direction of the offset vector based on the offset direction index and the set of offset directions and determines a step size of the offset vector based on the distance index and the set of step sizes. The processing circuitry further determines the offset vector based on the offset direction and the step size of the offset vector. In an example, the set of offset directions and the set of step sizes are unbiased. In an example, at least one of: the set of offset directions and the set of step sizes is biased. The set of offset directions can be biased toward a negative direction in one of: a horizontal direction and a vertical direction.

Each step size in the set of step sizes is equal to one of (i) one sample size and (ii) multiple sample sizes.

In an embodiment, the candidate list has a plurality of candidates including the block vector candidate and a motion vector candidate. The offset information indicates a number of offset directions and a number of step sizes used to predict the offset vector. In an example, the offset information includes a combined set of offset directions and a combined set of step sizes for constructing the offset vectors for the respective inter prediction mode and the IBC mode. In an example, the offset information includes separate sets of offset directions or separate sets of step sizes for constructing the offset vectors for the respective inter prediction mode and the IBC mode. In an example, the prediction information includes a base index. When the base index points to the block vector candidate in the candidate list, the processing circuitry determines that the prediction mode is the intra block copy mode and the base vector is the block vector candidate. When the base index points to the motion vector candidate in the candidate list, the processing circuitry determines that the prediction mode is the inter prediction mode and the base vector is the motion vector candidate.

In an embodiment, the processing circuitry clips the block vector to obtain a clipped block vector where the reference block pointed by the clipped block vector is shifted from the current block by one of (i) one sample size and (ii) multiple sample sizes in an x and a y direction.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 11A-11F show exemplary sets of offset directions that can be applied for a base predictor according to embodiments of the disclosure.

DETAILED DESCRIPTION OF EMBODIMENTS

Figure 1:
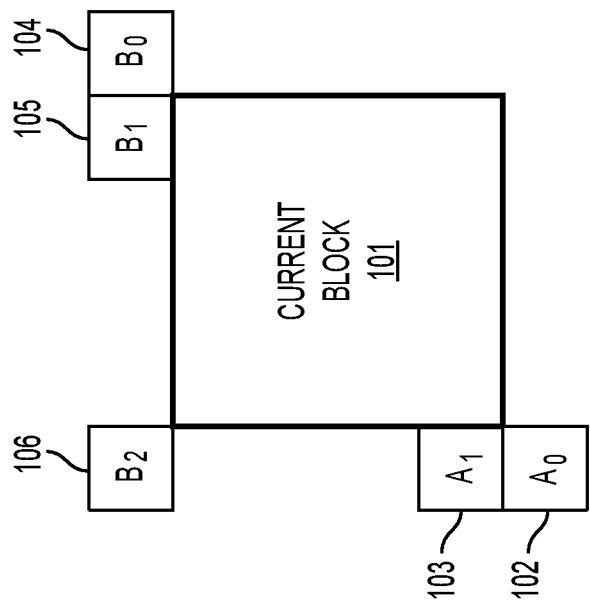
FIG. 1 is a schematic illustration of a current block and its surrounding spatial merge candidates in one example.
Figure 2:
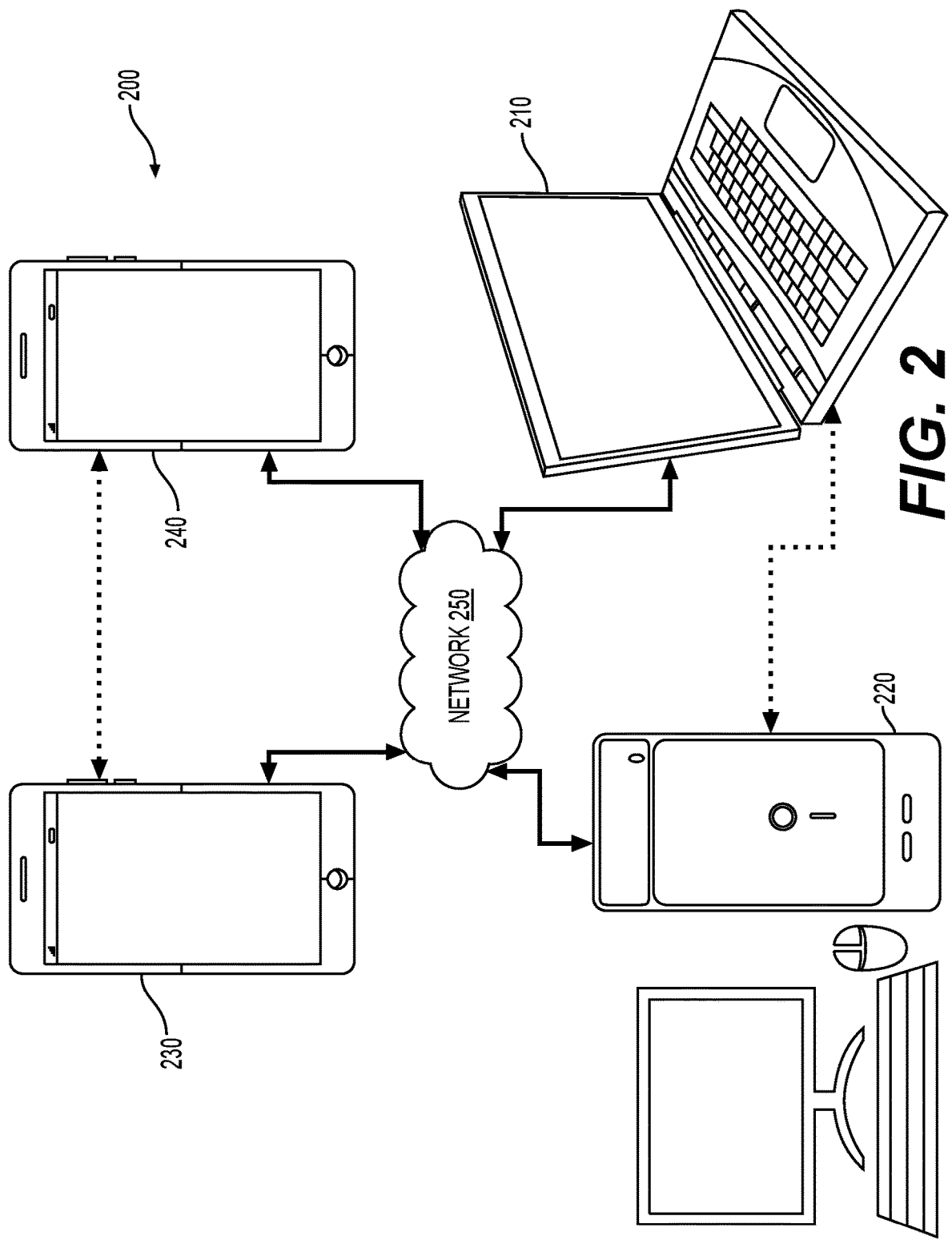
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240)

that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
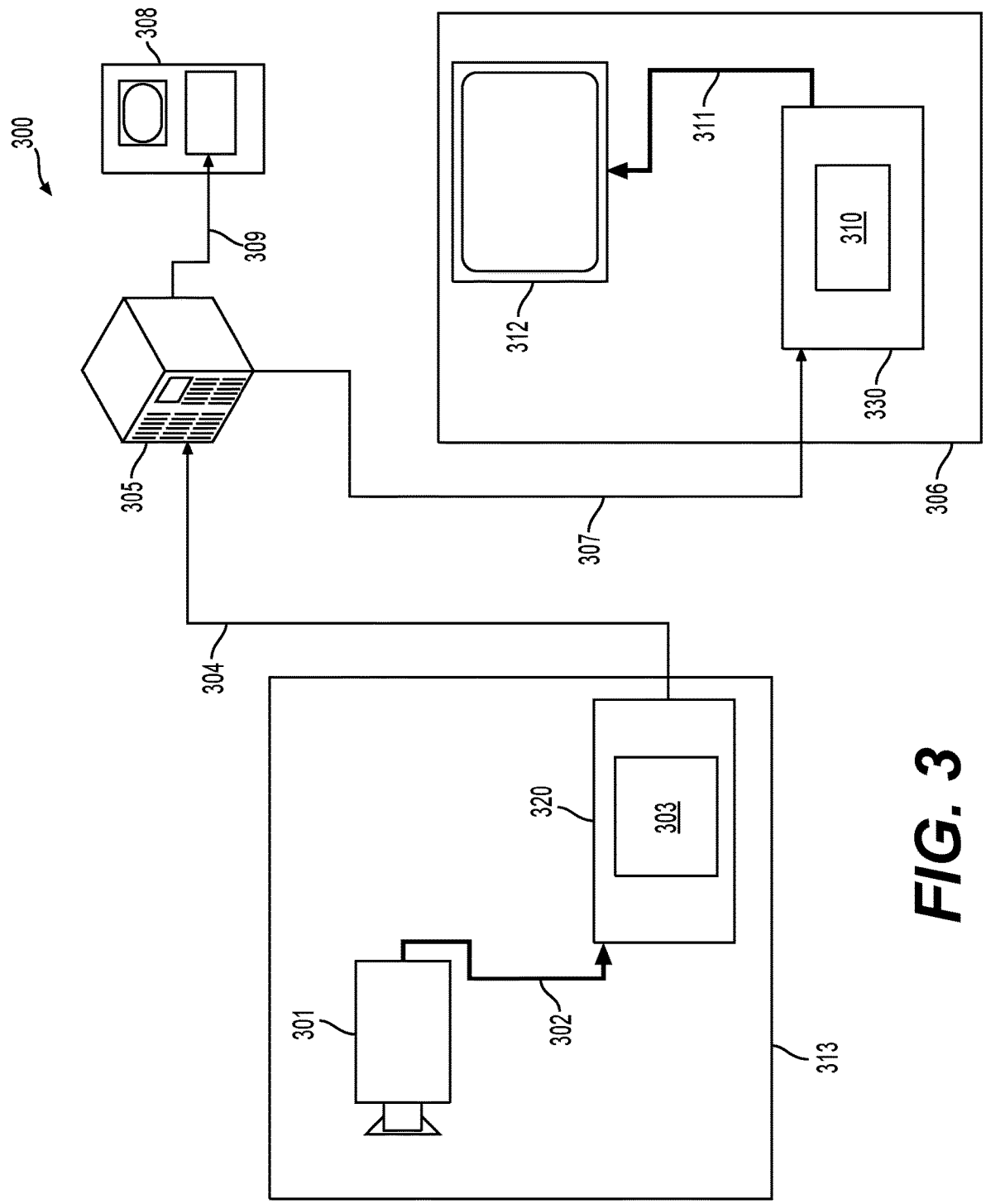
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
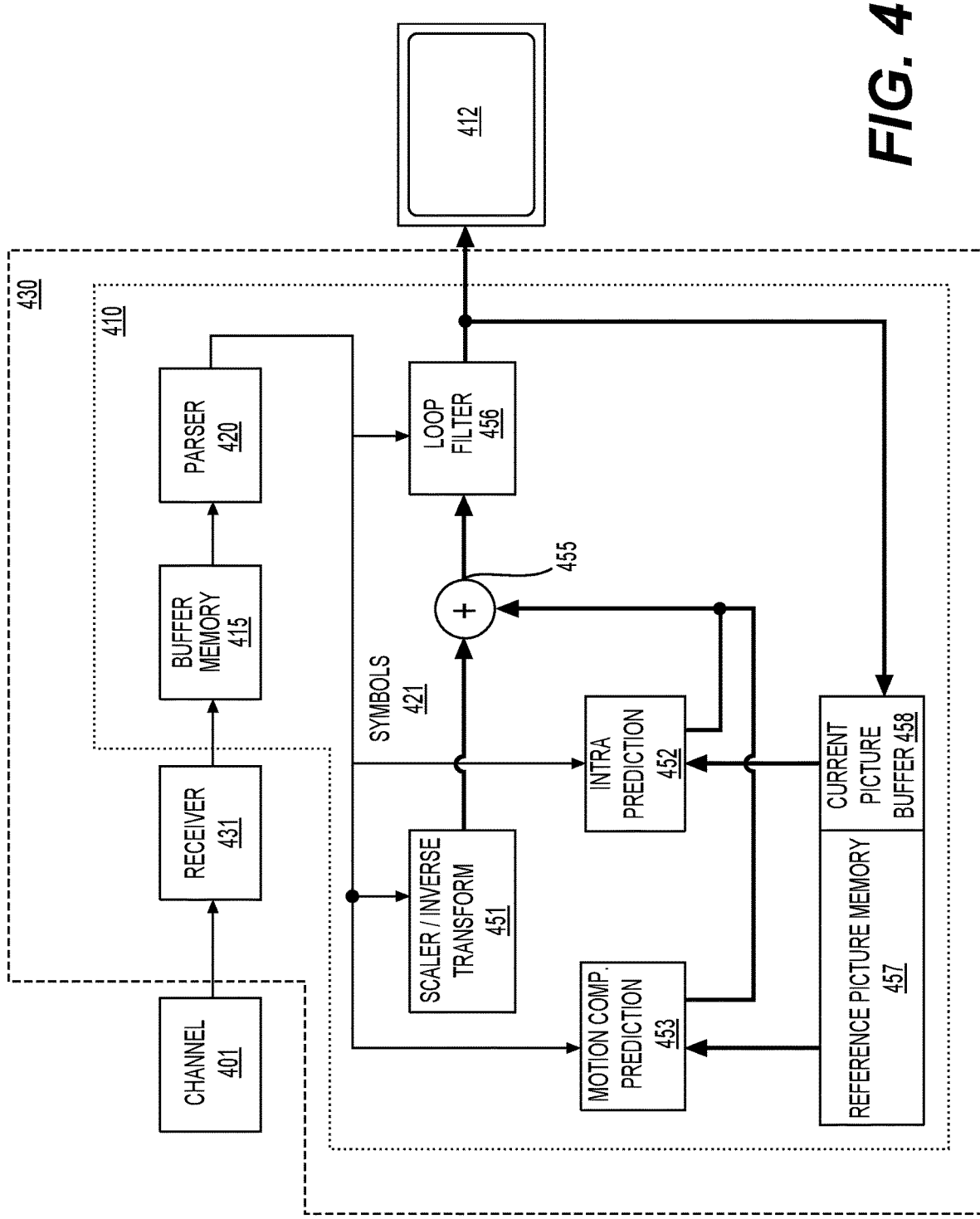
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
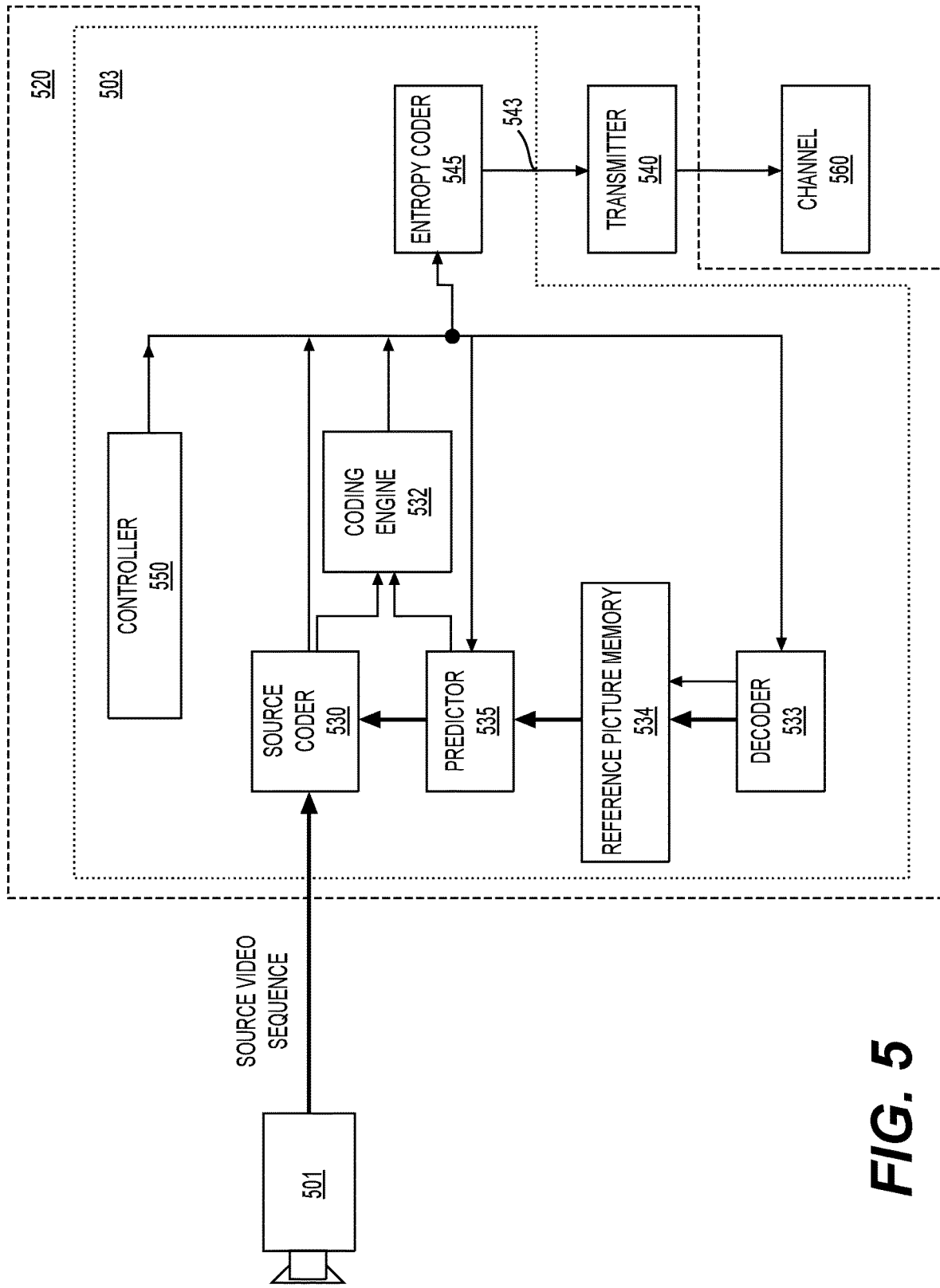
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PB s. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
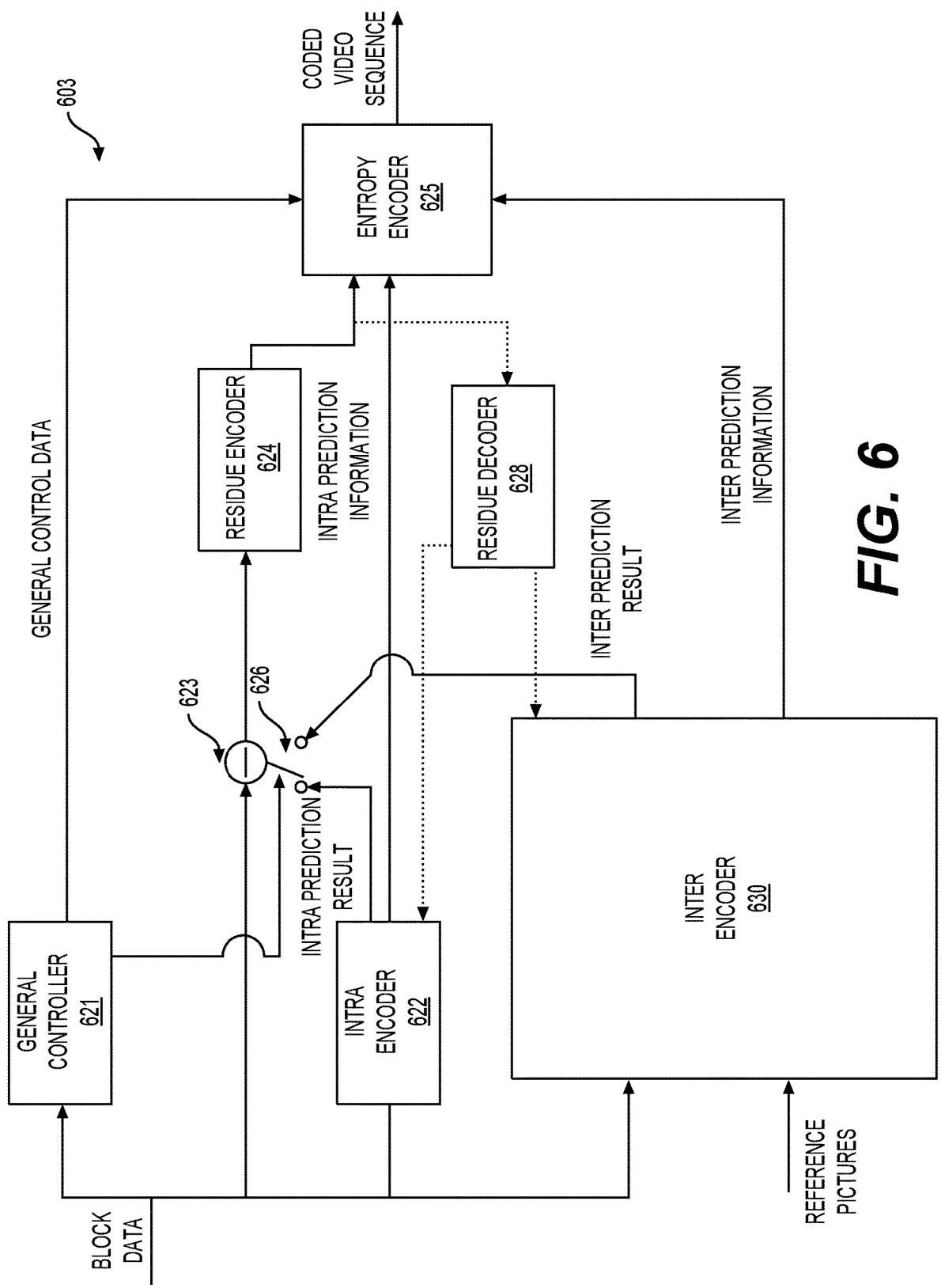
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
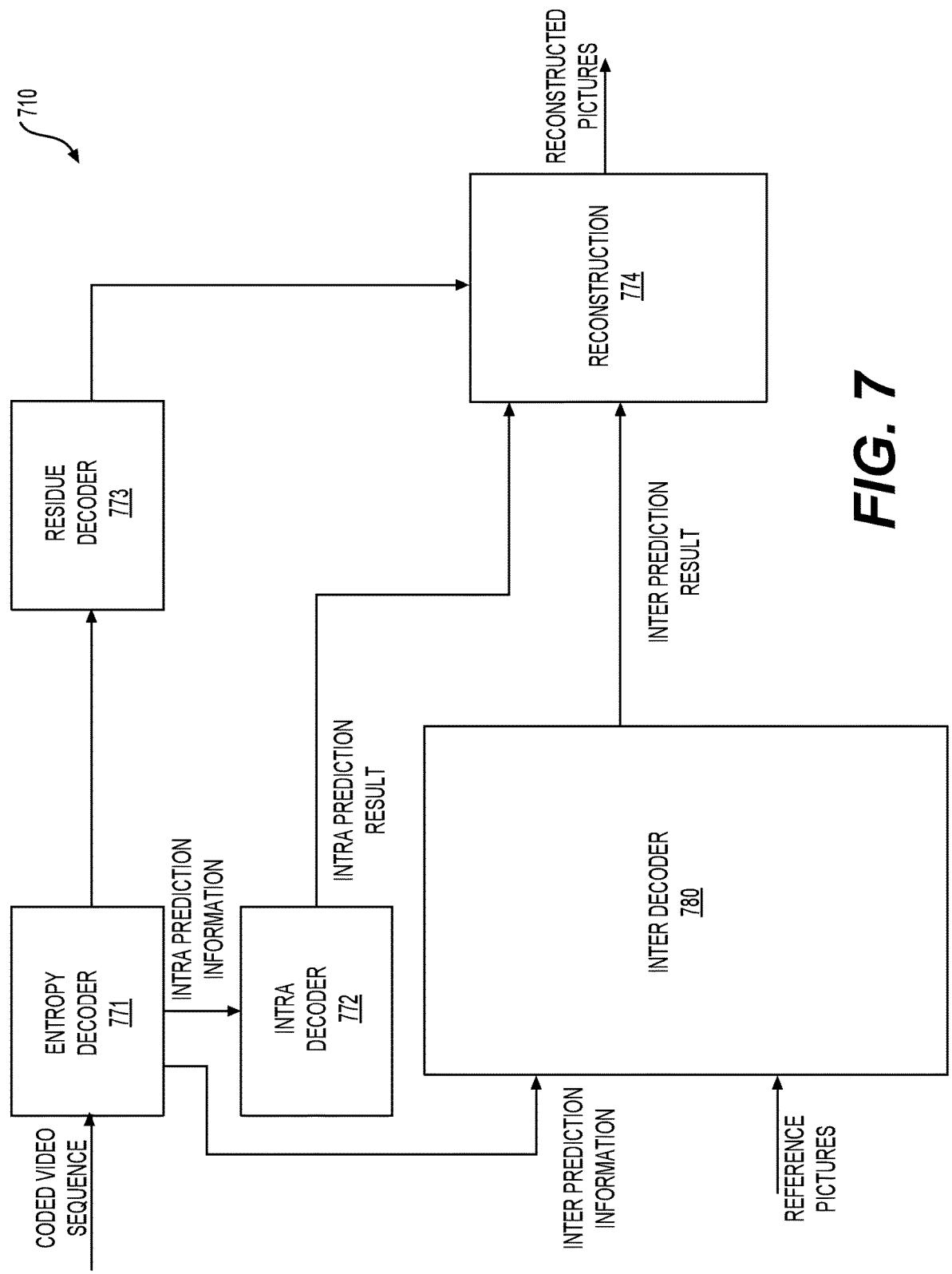
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques for block vector prediction with signaled offset and block vector clipping for intra picture block compensation.

Block based compensation can be used for inter prediction and intra prediction. For the inter prediction, block based compensation from a different picture is known as motion compensation. Block based compensation can also be performed from a previously reconstructed area within the same picture, such as in intra prediction. The block based compensation from the reconstructed area within the same picture can be referred to as intra picture block compensation, current picture referencing (CPR), or intra block copy (IBC). A displacement vector that indicates an offset between a current block and a reference block (also referred to as a prediction block) in the same picture is referred to as a block vector (BV) where the current block can be encoded/decoded based on the reference block. Different from a motion vector in motion compensation, which can have any value (positive or negative, at either x or y direction), a BV can have constraints to ensure that the reference block is available and already reconstructed. Also, for parallel processing considerations, a reference area in some examples such as a tile boundary, slice boundary, or wavefront ladder shape boundary can be excluded.

The coding of a BV can be either explicit or implicit. In the explicit mode, a BV difference between a BV and a BV predictor is signaled, which is similar to advanced motion vector prediction (AMVP) in the inter prediction. In the implicit mode, a BV can be recovered from a BV predictor without using a BV difference, in a similar way as a motion vector in a merge mode. In some examples, a resolution of a BV is restricted to an integer resolution and the BV can only point to integer positions. In some examples, a BV can have a fractional resolution and the BV can point to a fractional position.

The use of intra block copy at a block level can be signaled using a block level flag, such as an IBC flag. In an embodiment, the block level flag is signaled when the current block is not coded in merge mode. The use of intra block copy at a block level can be signaled using a reference index approach. The current picture under decoding is then treated as a reference picture or a special reference picture. In an example, such a reference picture is placed in the last position of a list of reference pictures. The special reference picture can also be managed together with other temporal reference pictures in a buffer, such as a decoded picture buffer (DPB).

While an embodiment of intra block copy is used as an example in the present disclosure, the embodiments of the present disclosure can be applied to variations of intra block copy. The variations of intra block copy include, for example, flipped intra block copy where the reference block is flipped horizontally or vertically before being used to predict a current block, or line based intra block copy where each compensation unit inside an M×N coding block is an M×1 or 1×N line.

Figure 8:
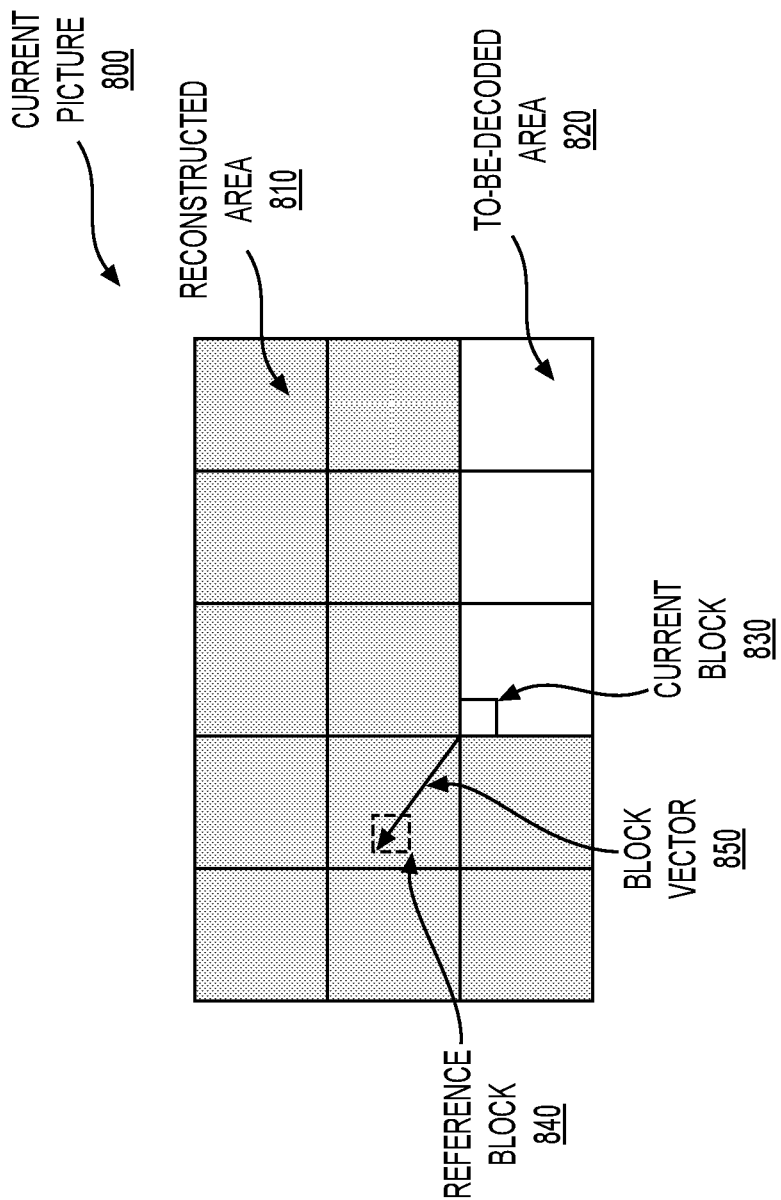
FIG. 8 shows an example of intra block copy according to an embodiment of the disclosure.

FIG. 8 shows an example of intra block copy according to an embodiment of the disclosure. A current picture (800) is to be reconstructed during decoding. The current picture (800) includes a reconstructed area (810) (grey area) and a to-be-decoded area (820) (white area). A current block (830) is under reconstruction by a decoder. The current block (830) can be reconstructed from a reference block (840) that is in the reconstructed area (810). A position offset between the reference block (840) and the current block (830) is referred to as a BV (850).

A BV of a current block under reconstruction in a current picture can have certain constraints, and thus, a reference block for the current block is within a reference area or a reference region in the current picture. The reference area refers to a part of the current picture from which the reference block can be selected. The BV and/or the reference area can be constrained. In an example, the BV is a two-dimensional vector including an x and a y component, and at least one of the x and y components is constrained. When certain constraints are specified with respect to the BV, the reference area and a location of the reference block can be constrained accordingly.

In some examples, reconstructed samples of the current picture are stored in a memory, for example a dedicated memory. To reduce implementation cost, the reference area is smaller than the current picture, and in some cases can be limited by a memory size. In an example, the reference block can be located only in a portion of the current picture, such as the reference area, as not all locations in the current picture contain a reference block. For example, when the memory size is one CTU, use of the IBC mode can be limited to only when the reference block is within the same CTU as the current block. When the memory size is two CTUs, use of the IBC mode can be limited to when the reference block is either within the current CTU or a previous CTU (e.g., a CTU to the left of the current CTU). When a block referred to by the BV is outside the reference area, even if the block is reconstructed and is located in a reconstructed area in the current picture, samples in the block may not be useable for the IBC compensation due to memory size constraints, and thus the block cannot be used as a reference block.

When the reference area or the BV is constrained, efficiency of the IBC mode can be limited. Embodiments of the disclosure can improve the efficiency of IBC with a constrained reference area or a constrained BV. In some embodiments, methods can be performed so that the BV is constrained to have negative component(s) in the X and/or the Y directions.

An inter prediction technique referred to as ultimate motion vector expression (UMVE) or merge mode with motion vector difference (MMVD) uses a special merge mode in which an offset vector (also referred to as an offset) including both a magnitude and a direction is signaled in addition to a merge candidate. In the UMVE mode, syntax elements, such as a prediction direction index (or a prediction direction IDX), a base candidate index (or base candidate IDX, also referred to as a base index or base IDX), a distance index (or distance IDX), an offset direction index (or offset direction IDX, also referred to as a search direction index or a search direction IDX), and/or other combinations of syntax elements, can be signaled to describe a merge candidate and a corresponding offset. For example, the prediction direction IDX is used to indicate one or more prediction directions (one or more temporal prediction directions, e.g., L0 reference direction, L1 reference direction, or L0 and L1 reference directions) used for the UMVE mode. The base candidate IDX is used to indicate a merge candidate used as a start point MV (also referred to as a start point vector, a base candidate, a base predictor, or a base vector) to apply the offset. The distance IDX is used to indicate a magnitude of the offset. In an embodiment, the magnitude can be represented by a shift size (or a step size) along either an X or a Y direction, but not along both the x and y directions from the start point MV. The step size can be chosen from a fixed number of selections, such as a fixed number of step sizes. The step sizes and/or the number of selections can be pre-defined in an encoder and/or a decoder. The offset direction IDX is used to indicate an offset direction of the offset, such as −X, +X, −Y, or +Y direction. The offset direction can be chosen from a set of offset directions. The offset directions and/or a number of the offset directions can be pre-defined in an encoder and/or a decoder.

For example, when the start point MV is MV_S and the offset is MV_offset, a final MV (MV_final) can be obtained as: MV_final=MV_S+MV_offset. In this example, MV_S, MV_offset, and MV_final are vectors, and the summation of MV_S and MV_offset is a vector summation. In an embodiment, a distance IDX and an offset direction IDX indicate a step size and an offset direction of the offset, MV_offset. When the offset direction IDX indicates that the offset MV_offset is only along a single axis (e.g., the x or the y axis), a magnitude of MV_offset is identical to the step size. When the offset direction IDX indicates that the offset MV_offset is along a direction, such as a diagonal direction between the x and the y axis, the magnitude of MV_offset can be determined based on the offset direction and the step size. For example, the final MV (MV_final) can be determined by shifting the step size along the x and the y axis, respectively.

Figure 9:
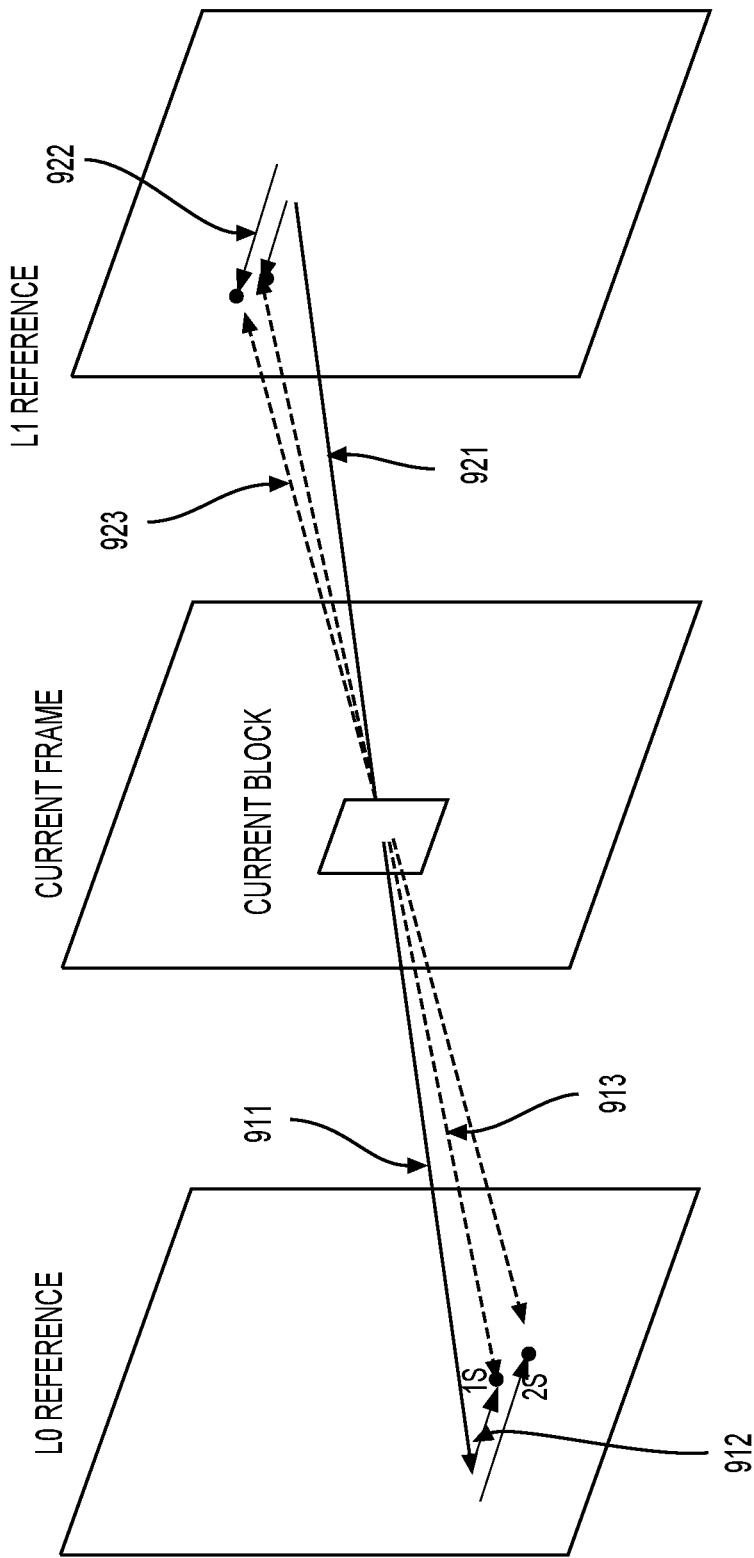
FIG. 9 shows examples of UMVE according to an embodiment of the disclosure.

FIG. 9 shows examples of UMVE according to an embodiment of the disclosure. In FIG. 9, the start point MV (911) (e.g., indicated by a first prediction direction IDX and base candidate IDX), the offset (912) (e.g., indicated by a first distance IDX and search direction IDX), and the final MV correspond to one example. Further, the start point MV (921) (e.g., indicated by a second prediction direction IDX and base candidate IDX), the offset (922) (e.g., indicated by a second distance IDX and search direction IDX), and the final MV (923) correspond to another example.

Figure 10:
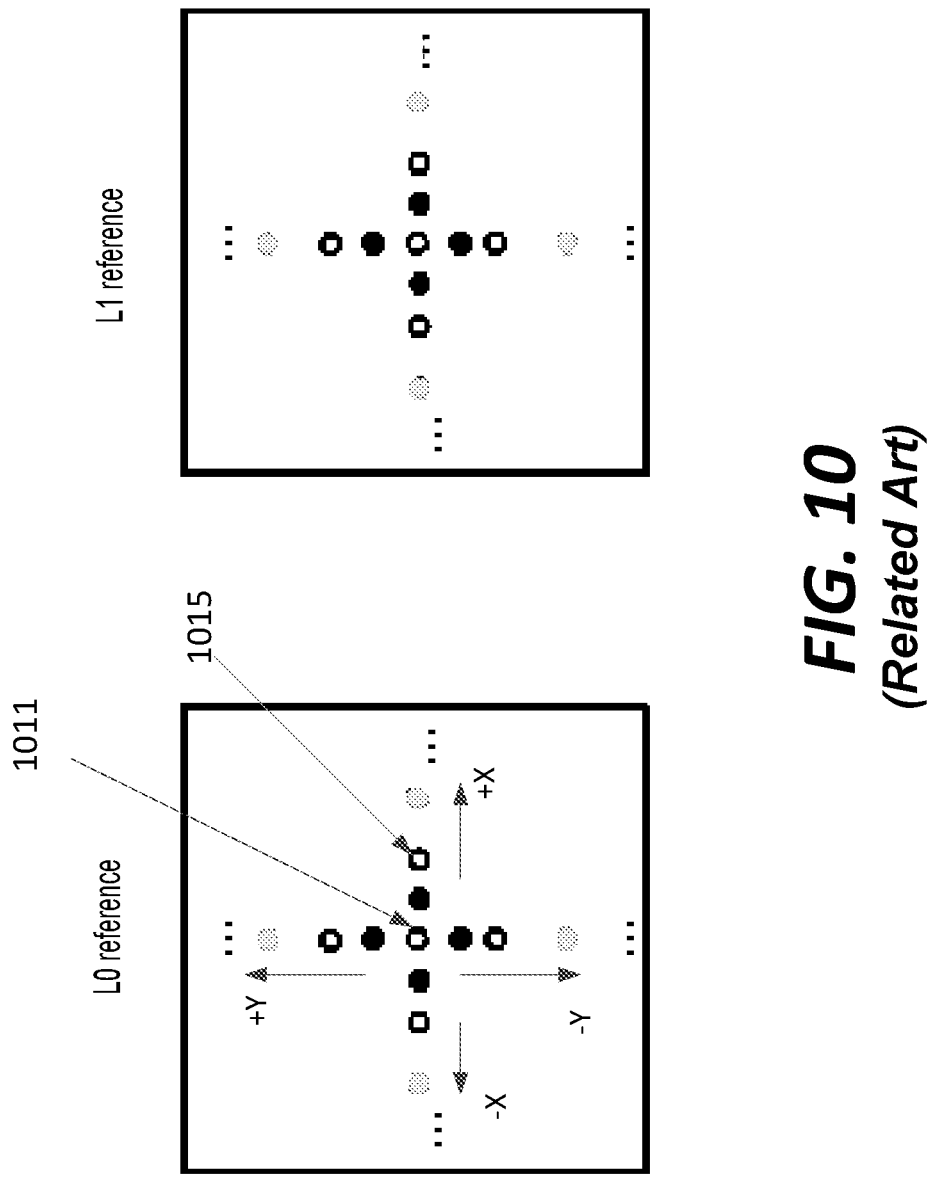
FIG. 10 shows examples of UMVE according to an embodiment of the disclosure.

FIG. 10 shows examples of UMVE according to an embodiment of the disclosure. For example, a start point MV (1011) (e.g., indicated by a prediction direction IDX and base candidate IDX) is shown. In the FIG. 10 example, 4 offset directions, i.e., +Y, −Y, +X and −X, are used, and the four offset directions can be indexed, for example, by offset direction indices 00, 01, 10, and 11, respectively. Step sizes of the offset can be indexed by distance indices. For example, the distance indices can include 00 (0 distance or no shift from the start point MV), 01 (1 sample distance from the start point MV), 10 (2 sample distances from the start point MV), 11 (3 sample distances from the start point MV), and the like. Thus, an offset direction IDX of 10 and a distance IDX of 10 correspond to the final MV (1015). The above description is given for the L0 reference, and can be suitably adapted for the L1 reference. Of course, any suitable methods can be used to represent offset directions and magnitudes (or step sizes).

Table 1 shows an example of a relationship between distance indices and respective step sizes of an offset. The step sizes can be pre-defined. A pre-defined step size can refer to a shift size between a base candidate and a final MV along the X or the Y direction, such as +Y, −Y, +X or −X. In an example, the pre-defined step size can have a fractional sample size, such as ¼ of a sample size.

TABLE 1

Exemplary distance indices and respective step sizes

| | Distance IDX | | | | | | | |
|---|---|---|---|---|---|---|---|---|
| | 0 | 1 | 2 | 3 | 4 | 5 | 6 | 7 |
| Step Size (in unit of luma sample) | ¼ | ½ | 1 | 2 | 4 | 8 | 16 | 32 |

A special merge mode referred to as a pairwise average merge mode can be used to generate a merge candidate. The merge candidate can be generated by averaging two existing merge candidates in a candidate list. For example, when the candidate list has N existing merge candidates, then $C_N^2$ pairs of candidate motion vectors can be averaged to generate new merge candidates.

When a current block in a current picture is predicted from a reference block in the same current picture, a BV for the current block can be signaled either explicitly (e.g., signaling a BV difference between a BV predictor and the BV, similar to an AMVP mode used for signaling a MV) or implicitly (e.g., only signaling the BV predictor without signaling the BV difference, similar to the merge mode used for signaling a MV). In some examples, a BV is very close to a BV predictor but not exactly identical to the BV predictor, and thus a BV difference is small. Signaling the small BV difference can be inefficient and can increase a signaling overhead.

Accordingly, embodiments are described to improve efficiency of signaling BV information, such as a BV difference between a BV predictor and a BV in the IBC mode. In an embodiment, instead of signaling the actual BV difference, at least one index (e.g., a combined distance/offset direction index, or a separate distance IDX and a separate offset direction IDX) can be signaled, and an offset can be determined based on the least one index, a set of step sizes, a set of offset directions, and/or the like. The offset can approximate, and thus may not be identical to, the BV difference.

Accordingly, the signaling cost of the at least one index can be significantly smaller than that of the BV difference. The set of step sizes and the set of offset directions can be pre-defined in, or otherwise previously provided to, a decoder, and thus no signaling may be needed for the set of step sizes and the set of offset directions. Thus, the IBC mode that signals indices for an offset vector can be more efficient than the IBC mode that signals the actual BV difference.

According to aspects of the disclosure, BV information for a BV of a current block is signaled. For example, a BV predictor (also referred to as a base predictor) is selected, for example from a candidate list. A base candidate index for the BV predictor can be signaled, for example, when the candidate list includes a plurality of candidates, and the selected BV predictor can be determined based on the base candidate index and the candidate list. An offset (or an offset vector) can be determined and then applied to the base predictor to determine a final BV. In an example, the offset is determined based on offset information, such as indices indicating a direction and a magnitude of the offset that are signaled in the BV information for example. The offset can be determined based on the indices and pre-defined offset directions and/or step sizes. The final BV can be determined by summing the base predictor and the offset.

As described above, offset information and information of a base predictor can be signaled to determine a final MV that can be used in the inter prediction or a final BV that can be used in the IBC mode. The base predictor can be used for MV prediction (or regular MV prediction) or BV prediction. Accordingly, methods of signaling the offset information in addition to the base predictor can be unified for MV prediction in the inter prediction and BV prediction in the IBC mode.

In an embodiment, a candidate list includes both BV candidate(s) and MV prediction candidate(s) or MVP candidate(s). BV candidate(s) can be referred to as IBC coded candidate(s). In an example, an IBC coded candidate is a BV from a previously coded block. MVP candidate(s) can be referred to as inter coded candidate(s) or regular inter coded candidate(s). In an example, MVP candidates can be merge candidates used in the merge mode. An Nth candidate in the candidate list can be determined as a base predictor by either including the BV candidate(s) or excluding the BV candidate(s). In an example, the BV candidate(s) are included when determining the Nth candidate. When the Nth candidate is one of the BV candidate(s), the IBC mode is determined to be used and an offset that is signaled is applied to the selected base predictor (i.e., the Nth candidate). In an example, the BV candidate(s) are excluded and thus only the MVP candidate(s) are included when determining the Nth candidate. Accordingly, none of the BV candidate(s) can be applied as the base predictor. For example, the candidate list is: {MVP 1, BV 1, BV 2, MVP 2, MVP 3, . . . } where the first 5 candidates in the candidate list include 2 BV candidates, BV 1-2, and 3 MVP candidates, MVP 1-3. When N is 2, a $2^{nd}$ candidate can be determined from the candidate list as follows. In an example, the 2 BV candidates are included when determining the $2^{nd}$ candidate. Accordingly, the $2^{nd}$ candidate is BV 1, and thus the IBC mode is used and the signaled offset is applied to the selected BV predictor, i.e., BV1. Alternatively, the 2 BV candidates are excluded when determining the $2^{nd}$ candidate. Accordingly, the $2^{nd}$ candidate, i.e., the $2^{nd}$ non-BV candidate or the $2^{nd}$ MVP candidate, is MVP 2, and thus the inter prediction mode is used and the signaled offset is applied to the selected MV predictor, i.e., MVP2.

When an offset vector is used and signaled in the IBC mode, the semantics for the offset vector in the IBC mode can be the same as or different from those used in the inter prediction mode, such as regular inter MV prediction.

At a decoder side, prediction information indicating a prediction mode for reconstructing a current block in a current picture can be decoded. The prediction mode can be the inter prediction mode, for example, when a reference block is in a reference picture different from the current picture, or the IBC mode when a reference block is in the current picture. A base vector or base predictor can be determined from a candidate list that, for example, includes one or more BV candidates and/or MVP candidates. An offset vector can be determined based on offset information. The offset information can indicate an offset direction and a step size for the offset vector. In an example, the offset information can include offset directions and step sizes that are available for constructing offset vectors. A vector (or a final vector) of the current block can be determined based on the base vector and the offset vector. The vector of the current block can indicate a reference block of the current block. The reference block is in the current picture and the vector of the current block is a BV when the prediction mode is the IBC mode, and the reference block is in a reference picture different from the current picture and the vector of the current block is a MV when the prediction mode is the inter prediction mode. Further, at least one sample in the current block can be reconstructed based on the vector of the current block.

In the IBC mode, the base vector or the base predictor can be selected as follows. When there are more than one base predictor candidate, for example, when a candidate list includes a plurality of candidates, an index (also referred to as a base candidate index) of the base predictor can be signaled. Accordingly, the base predictor can be selected from the candidate list based on the base candidate index. The candidate list can include candidates from spatial or temporal neighboring locations (e.g., spatial or temporal neighboring blocks) that are coded, for example, in the IBC mode, one or more BVs from previously decoded block(s) (e.g., in decoding order), and/or the like. In an example, when the candidate list includes only one candidate, the base candidate index is not signaled.

In an embodiment, the offset information can include an offset direction IDX and a distance IDX that are, for example, included in the prediction information. A set of offset directions and a set of step sizes available to be applied towards the base predictor can be pre-defined in an encoder and a decoder or otherwise made available to the encoder and the decoder. The offset direction can be determined based on the offset direction IDX and the set of offset directions, and the step size can be determined based on the distance IDX and the set of step sizes.

According to aspects of the disclosure, a set of offset directions available to be applied towards a base predictor can be unbiased, accordingly, no preferred direction(s) can be included in the set of offset directions. Alternatively, a set of offset directions available to be applied towards a base predictor can be biased, accordingly, one or more preferred directions (e.g., one or more negative directions) can be included in the set of offset directions.

As described above, in some examples, a BV can have constraints to ensure that the reference block is available and already reconstructed. The BV can be a two-dimensional vector including an x and a y component, and at least one of the x and y components is constrained. For example, the BVs can be constrained to have components in negative directions of X and/or Y axis (i.e., −X and/or −Y), and thus the set of offset directions may be biased toward −X and/or −Y. Corresponding binarization assignments of indices indicating the offset directions can be set such that more likely directions have shorter codewords (i.e., codewords with shorter lengths). Examples are described below to illustrate various sets of offset directions that are either unbiased or biased.

FIG. 11A shows an exemplary set of four unbiased offset directions that can be applied for a base predictor. Table 2 shows offset direction IDXs and the offset directions, respectively. In Table 2 and other tables below, −1 refers to a shift in a negative direction of an axis (either the negative X axis −X or the negative Y axis −Y), +1 refers to a shift in a positive direction of an axis (either the positive X axis +X or the positive Y axis +Y), 0 means no shift along the axis (either the X axis or the Y axis), and nonzero values in both the x axis and y axis refers to a shift in both the X and Y axis, and accordingly, the offset vector is shifted along a direction (e.g., a diagonal direction A1 in FIG. 11A) between the X and Y axes.

In general, an angle between the direction and +X direction can be any suitable value, such as 45°, 22.25°, or the like, and is not limited to a diagonal direction. In other words, −1 along the X axis indicates that the offset has a component in −X direction, +1 along the X axis indicates that the offset has a component in +X direction, −1 along the Y axis indicates that the offset has a component in −Y direction, and +1 along the Y axis indicates that the offset has a component in +Y direction. Therefore, in Table 2 and other tables below, an offset direction can be represented using a vector (n1, n2) where n1 or n2 can be a suitable integer, such as −1, 0, +1 (i.e., 1), or the like. Accordingly, (−1, 0) represents an offset direction along the negative x axis (−X), (+1, 0) represents an offset direction along the positive x axis (+X), (0, −1) represents an offset direction along the negative y axis (−Y), and (0, +1) represents an offset direction along the positive Y axis (+Y).

In the example shown in FIG. 11A and Table 2, the offset directions include −x or (−1, 0) indicated by the offset direction IDX 00, +x or (+1, 0) indicated by the offset direction IDX 11, +y or (0, +1) indicated by the offset direction IDX 10, and −y or (0, −1) indicated by the offset direction IDX 01, and thus the offset between a BV and a base predictor is either along the x or the y direction. For example, the offset cannot be in the diagonal direction A1. The offset directions can be coded with codewords, such as 00, 01, 10, and 11, having a same length, such as 2 bits, shown in Table 2. Accordingly, a signaling cost is the same for the offset directions and no preference is given to choose an offset direction preferably than other offset directions. The offset direction IDX, such as 00, 01, 10, or 11, can be the syntax element signaled to a decoder side.

TABLE 2 offset direction IDXs and the offset directions

| | Offset Direction IDX | | | |
|---|---|---|---|---|
| | 00 | 01 | 10 | 11 |
| x-axis | −1 | 0 | 0 | +1 |
| y-axis | 0 | −1 | +1 | 0 |

FIG. 11B shows an exemplary set of eight unbiased offset directions that can be applied for a base predictor. Table 3 shows offset direction IDXs and the offset directions, respectively. Referring to FIG. 11B and Table 3, the offset directions can include directions along the x and y axes as well as directions that are between the x and y axes. More specifically, the offset directions include −x or (−1, 0) indicated by the offset direction IDX 001, +x or (+1, 0) indicated by the offset direction IDX 000, +y or (0, +1) indicated by the offset direction IDX 010, and −y or (0, −1) indicated by the offset direction IDX 011, and diagonal directions (+1, +1), (−1, −1), (+1, −1), and (−1, +1) indicated by the respective offset direction IDXs 100, 101, 110, and 111. Accordingly, an offset can be in a diagonal direction, such as the diagonal direction IDX 100. The offset directions can be coded with codewords, such as 000, 001, 010, 011, and the like, having a same length, such as 3 bits, shown in Table 3. Accordingly, a signaling cost is the same for the offset directions and no preference is given to choose an offset direction over other offset directions. The offset direction IDX, such as 000, 001, or the like, can be the syntax element signaled to the decoder side.

TABLE 3 offset direction IDXs and the offset directions

| | Offset Direction IDX | | | | | | | |
|---|---|---|---|---|---|---|---|---|
| | 000 | 001 | 010 | 011 | 100 | 101 | 110 | 111 |
| x-axis | +1 | −1 | 0 | 0 | +1 | −1 | +1 | −1 |
| y-axis | 0 | 0 | +1 | −1 | +1 | −1 | −1 | +1 |

FIG. 11C shows an exemplary set of four biased offset directions that can be applied for a base predictor. Table 4 shows offset direction IDXs and the offset directions, respectively. Similar to the example shown in FIG. 11A and Table 2, the offset directions are either in the x direction or the y direction, and cannot be in a direction, such as a direction C1, between the x and y axes. However, there is a preference to choose negative directions including −x and −y, and thus codewords having shorter lengths are assigned for the offset direction IDXs for the negative directions. For example, the offset directions include −x or (−1, 0) indicated by the offset direction IDX 0, +x or (+1, 0) indicated by the offset direction IDX 111, +y or (0, +1) indicated by the offset direction IDX 110, and −y or (0, −1) indicated by the offset direction IDX 10. Accordingly, signaling costs can be different for the offset directions where the signaling cost is lowest for −X (i.e., 1 bit), followed by −Y (i.e., 2 bits), and highest for +X and +Y (i.e., 3 bits for +X and +Y). Therefore, a preference is given to −X and −Y indexed by the respective offset direction IDX 0 and 10. The offset direction IDX, such as 0, 10, or the like, can be the syntax element signaled to the decoder side.

TABLE 4 offset direction IDXs and the offset directions

| | Offset Direction IDX | | | |
|---|---|---|---|---|
| | 0 | 10 | 110 | 111 |
| x-axis | −1 | 0 | 0 | +1 |
| y-axis | 0 | −1 | +1 | 0 |

FIG. 11D shows an exemplary set of eight biased offset directions that can be applied for a base predictor. Table 5 shows offset direction IDXs and the offset directions, respectively. Similar to the example shown in FIG. 11B and Table 3, the offset directions can be in the x direction, the y direction, or a direction between the x and y axes. However, there is a preference to choose negative directions including −x and −y, and thus codewords having shorter lengths are assigned for the offset direction IDXs for the negative directions. For example, the offset directions include −x or (−1, 0) indicated by the offset direction IDX 00, −y or (0, −1) indicated by the offset direction IDX 01, a diagonal direction (−1, −1) indicated by the offset direction IDX 10, +x or (+1, 0) indicated by the offset direction IDX 11111, +y or (0, +1) indicated by the offset direction IDX 1101, and other diagonal directions (−1, +1), (+1, −1), (+1, +1) indicated by the respective offset direction IDXs 1100, 1110, and 11110. Accordingly, signaling costs can be different for the offset directions where the signaling cost is lowest for −X, −Y, and (−1, −1) (i.e., 2 bits), followed by +Y, (−1, +1), and (+1, −1) (i.e., 4 bits), and highest for +X and (+1, +1) (i.e., 5 bits). Therefore, a preference is given to −X, —Y, or (−1, −1). The offset direction IDX, such as 00, 10, or the like, can be the syntax element signaled to the decoder side.

TABLE 5 offset direction IDXs and the offset directions

| | Offset Direction IDX | | | | | | | |
|---|---|---|---|---|---|---|---|---|
| | 00 | 01 | 1101 | 1100 | 10 | 1110 | 11111 | 11110 |
| x-axis | −1 | 0 | 0 | −1 | −1 | +1 | +1 | +1 |
| y-axis | 0 | −1 | +1 | +1 | −1 | −1 | 0 | +1 |

FIG. 11E shows an exemplary set of two biased offset directions that can be applied for a base predictor. Table 6 shows offset direction IDXs and the offset directions, respectively. The offset directions can be −X (i.e., (−1, 0)) indicated by the offset direction IDX 0 or −Y (i.e., (0, −1)) indicated by the offset direction IDX 1. Accordingly, an offset direction can only be selected from a negative direction, −x or −y, because no codewords are assigned to other directions such as +x, +y, or the like. The offset direction IDX, 0 or 1, can be the syntax element signaled to the decoder side.

TABLE 6 offset direction IDXs and the offset directions

| | Offset Direction IDX | |
|---|---|---|
| | 0 | 1 |
| x-axis | −1 | 0 |
| y-axis | 0 | −1 |

FIG. 11F shows an exemplary set of five biased offset directions that can be applied for a base predictor. Table 7 shows offset direction IDXs and the offset directions, respectively. Referring to FIG. 11F and Table 7, the offset directions are biased toward −X and an offset cannot have a component in +X. For example, the offset directions can include −x indicated by the offset direction IDX 00, −y indicated by the offset direction IDX 01, +y indicated by the offset direction IDX 10, and diagonal directions indicated by the offset direction IDXs 110 and 111. There is a preference to choose −x, −y, or +Y, and thus shorter codewords (i.e., 2 bits) are assigned for the offset direction IDXs for −x, −y, and +Y. Signaling costs can be different for the offset directions. No codewords are assigned to directions such as +x. The offset direction IDX, such as 00, 10, or the like, can be the syntax element signaled to the decoder side.

TABLE 7 offset direction IDXs and the offset directions

| | Offset Direction IDX | | | | |
|---|---|---|---|---|---|
| | 00 | 01 | 10 | 110 | 111 |
| x-axis | −1 | 0 | 0 | −1 | −1 |
| y-axis | 0 | −1 | +1 | −1 | +1 |

Of course, other suitable sets of offset directions can be used, and any suitable binarization method or codeword assignment can be used for coding the offset direction IDXs for a set of offset directions. For example, other binarization that reflects a preference for one or more directions, for example negative directions, by coding the one or more with shorter codewords can also be used.

According to aspects of the disclosure, a set of step sizes (or shift sizes) of offsets can be applied towards a base predictor. The set of the step sizes of the offsets can be unbiased, in which case no preferences are assigned to the set of step sizes. Accordingly, binarization for distance indices that indicate the step sizes can use codewords having a fixed length. Alternatively, the set of step sizes of the offsets can be biased, and thus binarization for distance indices can use codewords having variable lengths. For example, binarization assignments of distances indices can be biased such that the more likely step sizes (i.e., preferred step sizes) correspond to shorter codewords. Further, in an example, a BV is constrained to have an integer resolution, and thus a step size is equal to a sample size or multiple sample sizes. The sample size can be a luma sample size. Examples are described below to illustrate various sets of step sizes that are either unbiased or biased.

Table 8 shows an exemplary set of four unbiased step sizes for an offset vector that can be applied to a base predictor. For example, the step sizes are 1-sample, 2-sample, 4-sample, and 8-sample in terms of luma samples, and the step sizes are indexed by distances indices 00, 01, 10, and 11. Binarization for the distance indices uses codewords having a fixed length, i.e., 2 bits, and thus is unbiased. The distance index, such as 00 indicating a step size of 1 sample can be a syntax element signaled to the decoder side.

TABLE 8 distance indices and respective step sizes

| | Distance IDX | | | |
|---|---|---|---|---|
| | 00 | 01 | 10 | 11 |
| Step sizes | 1- sample | 2- sample | 4- sample | 8- sample |

Table 9 shows an exemplary set of four unbiased step sizes for an offset vector that can be applied to a base predictor. For example, the step sizes are 1-sample, 2-sample, 3-sample, and 4-sample in terms of luma samples, and the step sizes are indexed by distances indices 00, 01, 10, and 11. Binarization for the distance indices uses codewords having a fixed length, i.e., 2 bits, and thus is unbiased. The distance index, such as 00 indicating a step size of 1 sample can be a syntax element signaled to the decoder side.

TABLE 9

| distance indices and respective step sizes | | | | |
|---|---|---|---|---|
| | Distance IDX | | | |
| | 00 | 01 | 10 | 11 |
| Step sizes | 1- sample | 2- sample | 3- sample | 4- sample |

Table 10 shows an exemplary set of four biased step sizes for an offset vector that can be applied to a base predictor. For example, the step sizes are 1-sample, 2-sample, 4-sample, and 8-sample in terms of luma samples, and the step sizes are indexed by distances indices 0, 10, 110, and 111. Binarization for the distance indices uses codewords having variable lengths, such as from 1 to 3 bits, and thus can be biased toward the step size of 1 sample that corresponds to the distance IDX of "0" having the shortest codeword length. The distance index, such as 0 indicating a step size of 1 sample can be a syntax element signaled to the decoder side.

TABLE 10

| distance indices and respective step sizes | | | | |
|---|---|---|---|---|
| | Distance IDX | | | |
| | 0 | 10 | 110 | 111 |
| Step sizes | 1- sample | 2- sample | 4- sample | 8- sample |

Table 11 shows an exemplary set of four biased step sizes for an offset vector that can be applied for a base predictor. For example, the step sizes are 1-sample, 2-sample, 3-sample, and 4-sample in terms of luma samples, and the step sizes are indexed by distances indices 0, 10, 100, and 1000. Binarization for the distance indices uses codewords having variable lengths, such as from 1 to 4 bits, and thus can be biased toward the step size of 1 sample that corresponds to the distance IDX of "0" having the shortest codeword length. The distance index, such as 0 indicating a step size of 1 sample can be a syntax element signaled to the decoder side.

TABLE 11

| distance indices and respective step sizes | | | | |
|---|---|---|---|---|
| | Distance IDX | | | |
| | 0 | 10 | 100 | 1000 |
| Step sizes | 1- sample | 2- sample | 3- sample | 4- sample |

An offset or offset vector can be determined based on a distance IDX, an offset direction IDX, a set of offset directions, and a set of step sizes available to be applied to a base predictor. For example, a distance IDX of "10" and an offset direction IDX of "0" are signaled to the decoder and decoded by the decoder. An example of the set of offset directions is shown in Table 4 and FIG. 11C, and an example of the set of step sizes is shown in Table 8. In an example, the set of offset directions and/or the set of step sizes are pre-defined in, or otherwise acquired by, the decoder. Therefore, in this example, the offset can be determined to be in the negative X direction and having a magnitude of 4 samples as indicated by the indices. Accordingly, a BV can be obtained by performing a vector summation of the offset vector and the base predictor, for example, by shifting the base predictor 4 samples in the negative X direction.

Further, in some embodiments, when a selected direction is a diagonal direction (e.g., when eight directions are available) the step size can indicate the same step size for both the x and y axes. For example, when an offset direction is along a diagonal direction, such as the diagonal direction (−1, +1) having the offset direction IDX of 111 in FIG. 11B, the step size indicates that the step size is applied to both −x and +y axes. When an offset is in the diagonal direction (−1, +1) and the step size is 2-sample, a BV can be obtained by shifting the base predictor 2 samples in the negative X direction and 2 samples in the positive Y direction.

Of course, other suitable sets of step sizes can be used, and any suitable binarization method or codeword assignments can be used for coding the distance IDXs. A set of offset directions can be used with any suitable set of step sizes, for example, by a decoder.

As described above, signaling offset information, such as an offset direction IDX and/or a distance IDX, in addition to a base predictor, such as a MV predictor or a BV predictor, can be unified for MV prediction in the inter prediction and BV prediction in the IBC mode. For example, a unified syntax structure associated with signaling offset information can be used for MV prediction in the inter prediction mode and BV prediction in the IBC mode. A number of offset directions, a number of step sizes, and binarization of the two syntax elements can be shared between MV prediction and BV prediction, as described below.

In an embodiment, semantics of a set of step sizes (or magnitudes of offsets) and/or a set of offset direction can be shared. When an offset generated by a combination of a distance IDX and an offset direction IDX is not a valid offset for the IBC mode (for example, the determined offset and the base predictor result in a final vector that is a fractional vector that has a fractional resolution, or the final vector points to a reference block in an invalid reference area), the offset is not allowed and cannot be chosen. For example, the bitstream conformance requirements set for both an encoder and a decoder to make sure a decoded BV is a valid vector can guarantee that the offset is not chosen.

Table 12 shows exemplary distance indices and a set of step sizes of offsets that can be shared by MV prediction and BV prediction. 1 pel refers to 1 pixel or a sample size. Distance indices 0-7 refer to 8 step sizes: ¼ pel, ½ pel, 1 pel, 2 pel, 4 pel, 8 pel, 16 pel, and 32 pel of an offset. For a MV predicted by a base predictor and an offset, one of the 8 step sizes can be selected to be the step size of the offset. However, in some examples, for a BV predicted by a base predictor and an offset, only one of the 6 step sizes: 1 pel, 2 pel, 4 pel, 8 pel, 16 pel, and 32 pel can be selected to be the step size of the offset when the BV is constrained to have integer resolution. Therefore, both the MV prediction and the BV prediction using respective offsets can use the same set of step sizes and distance IDXs. However, in some examples, certain step sizes are excluded from the BV prediction.

TABLE 12 distance indices and respective step sizes

| | Distance IDX | | | | | | | |
|---|---|---|---|---|---|---|---|---|
| | 0 | 1 | 2 | 3 | 4 | 5 | 6 | 7 |
| Step size | ¼-pel | ½-pel | 1-pel | 2-pel | 4-pel | 8-pel | 16-pel | 32-pel |

In an embodiment, semantics of a set of step sizes and a set of offset direction used for BV prediction can be different from those used for MV prediction. For example, the step sizes for respective distance indices have 1-pel interval for an offset used for predicting a BV. Accordingly, fractional step sizes, such as ¼-pel and ½-pel in Table 12, that are used for predicting a MV can be removed from a set of step sizes used to predict a BV. For example, Table 12 shows the set of step sizes used to predict a MV. Table 13 shows a set of step sizes used to predict a BV where the fractional step sizes, i.e., ¼-pel and ½-pel in Table 12 are removed and remaining integer step sizes: 1-pel, 2-pel, 4-pel, 8-pel, 16-pel, and 32-pel are shifted to a beginning of Table 13. In an example, 2 extra integer step sizes are added to generate Table 14, and thus, the number of step sizes in Table 14 is identical to that in Table 12.

TABLE 13 distance indices and respective step sizes

| | Distance IDX | | | | | |
|---|---|---|---|---|---|---|
| | 0 | 1 | 2 | 3 | 4 | 5 |
| Step size | 1-pel | 2-pel | 4-pel | 8-pel | 16-pel | 32-pel |

TABLE 14 distance indices and respective step sizes

| | Distance IDX | | | | | | | |
|---|---|---|---|---|---|---|---|---|
| | 0 | 1 | 2 | 3 | 4 | 5 | 6 | 7 |
| Step size | 1-pel | 2-pel | 4-pel | 8-pel | 16-pel | 32-pel | 64-pel | 96-pel |

In an embodiment, the syntax structure is shared, however, the binarization of indices, such as distance indices, offset direction indices, and the like, and semantics of the indices can be different for MV prediction and BV prediction. For example, 4 offset directions: −X, +X, −Y, and +Y can be used in both the MV prediction and the BV prediction, however, the offset directions used in the MV prediction are unbiased while the offset directions used in the BV prediction are biased. Thus, binarization of the offset direction indices of the MV prediction can be different from that of the BV prediction, and semantics of the offset direction indices can be different. In an example, Table 4 shows offset direction IDXs and the respective offset directions for BV prediction. The offset direction indices for −X, +X, −Y, and +Y are 0, 111, 10, and 110, respectively. Therefore, a preference is given to −X and —Y that are assigned with shorter codewords. On the other hand, Table 15 shows exemplary offset direction IDXs and the respective offset directions for the MV prediction. The offset direction indices for −X, +X, −Y, and +Y are 00, 10, 01, and 11, respectively. Therefore, there is no preference for a specific direction since the codewords have a same length.

TABLE 15 offset direction IDXs and the offset directions

| | Offset Direction IDX | | | |
|---|---|---|---|---|
| | 00 | 01 | 11 | 10 |
| x-axis | −1 | 0 | 0 | +1 |
| y-axis | 0 | −1 | +1 | 0 |

Signaling of a base predictor in MV prediction and BV prediction can be unified in a same candidate list. As described above, a candidate list can include a combination of BV and MVP candidates. In an example, an Nth candidate in the candidate list can be determined as a base predictor by including one or more BV candidates. When the Nth candidate is a BV candidate, the IBC mode is determined to be used and an offset that is signaled is applied to the selected base predictor (i.e., the Nth candidate) to determine a BV. For example, the candidate list is: {MVP 1, BV 1, BV 2, MVP 2, MVP 3, . . . } where the first 5 candidates in the candidate list include 2 BV candidates, BV 1-2, and 3 MVP candidates, MVP 1-3. When the base index is, for example, 2, a second candidate is determined from the candidate list. Accordingly, the second candidate is BV 1, and thus the IBC mode is used and the signaled offset is applied to the selected BV predictor, i.e., BV1. When the base index is, for example, 4, a $4^{th}$ candidate is determined from the candidate list. Accordingly, the $4^{th}$ candidate is MVP2, and thus the regular inter prediction mode is used, and the signaled offset is applied to the selected MV predictor, i.e., MVP2 to predict a MV. The current coding block is coded in the regular inter mode.

Signaling of a base predictor in MV prediction and BV prediction can be implemented separately while using a same candidate list. As described above, a candidate list can include a combination of BV and MVP candidates. In an example of the MV prediction, an Nth candidate in the candidate list can be determined as a base predictor by excluding the BV candidate(s). Using the candidate list {MVP 1, BV 1, BV 2, MVP 2, MVP 3, . . . } described above, when the base index is 2, a second candidate is determined from the candidate list with the 2 BV candidates excluded. Accordingly, the second candidate, i.e., the second non-BV candidate or the second MVP candidate, is MVP 2, and thus the inter prediction mode is used and the signaled offset is applied to the selected MV predictor, i.e., MVP2. The current coding block is coded in the regular inter mode. In an example of the BV prediction, an Nth candidate in the candidate list can be determined as a base predictor by excluding the MV candidate(s). Using the candidate list {MVP 1, BV 1, BV 2, MVP 2, MVP 3, . . . } described above, when the base index is 2, a second candidate is determined from the candidate list with the 3 MV candidates excluded. Accordingly, the second candidate, i.e., the second non-MV candidate or the second BV candidate, is BV 2, and thus the IBC mode is used and the signaled offset is applied to the selected BV predictor, i.e., BV 2. The current coding block is coded in the IBC mode.

In some embodiments, a BV can be clipped or rounded. For example, the BV can be clipped so that the BV satisfies a constraint that the BV has an integer resolution. To improve the efficiency of BV prediction, when a BV predictor, an offset used to predict a BV, or a BV has a fractional resolution or a fractional-pel part, a clipping operation can be performed in the BV prediction. In the description below, the clipping operation can include removing a fractional-pel part from the BV, rounding the BV to a nearest integer, or the like. The clipping operation can be performed alone or can be combined with any suitable method. For example, the clipping operation can be used when (i) a BV is predicted based on a base predictor and an offset vector, (ii) a pairwise average method is used to generate a BV candidate by averaging two existing candidates in a candidate list, (iii) a BV is predicted using a method (i.e., predicting the BV based on a BV predictor and a BV difference where the BV difference between the BV predictor and the BV is signaled) similar to AMVP that is used to predict a MV, and/or the like.

As described above, a BV can be predicted based on a base predictor and an offset vector (or offset) in the BV prediction. Further, in an embodiment, when the offset and/or the base predictor has a fractional resolution, the resulting BV (i.e., a summation of the base predictor and the offset) is at a fractional-pel position along a chosen offset direction. For example, the offset can have a fractional resolution when the offset is displaced or shifted from the base predictor by a fractional-pel distance or a fractional shift size. The base predictor can have a fractional resolution when, for example, the base predictor corresponds to a merge candidate in a candidate list where the merge candidate is used to predict a MV. For purpose of clarity, the resulting BV is also referred to as an initial BV when describing various clipping operations. When the final BV is constrained to only have integer resolution or only point to integer positions, a clipping operation can be performed on the resulting BV (or the initial BV) as described below.

In an embodiment, a fractional part of the final BV is clipped to be zero. In an example, the clipping operation is performed as Equation (1)

$$BV\_clipped=(BV\_pred>>(N))<<(N) \quad (1)$$

where BV_clipped is the final BV (also referred to as the clipped BV) after the clipping operation, BV_pred is the initial BV, i.e., the summation of the base predictor and the offset. N indicates an accuracy of the initial BV, and the initial BV has a $1/(2^N)$-pel accuracy. In an example, such as in VVC, N is 4, and the initial BV is stored at $\frac{1}{16}$-pel accuracy, the clipping operation removes the fractional part of the initial BV, and the final BV has an integer resolution. The initial BV and the final BV can be a 2D vector, and thus the clipping operation shown in Eq. (1) can be performed for one or each component of the 2D vector. Accordingly, the clipping operation can be performed for an X component (BVPx) and a Y component (BVPy) of the initial BV such that the X component (BVx) and the Y component (BVy) of the final BV have the integer resolution. In an example, BVPx is 2.25-pel along −X and BVPy is 1.75-pel along +Y, after the clipping operation, BVx is 2-pel along −X and BVy is 1-pel along +Y where the fractional parts of the initial BV are removed.

In an embodiment, the clipping operation is similar to that is described above in Eq. (1), however, the clipping operation is described in Eq. (2) as below.

$$BV\_clipped=((BV\_pred+2^{(N-1)})>>(N))<<(N) \quad (2)$$

where the final BV is rounded to a nearest integer. Similarly, the clipping operation shown in Eq. (2) can be performed for one or each component of the initial BV. As described above, N indicates an accuracy of the initial BV that has a $1/(2^N)$-pel accuracy. In an example, BVPx is 2.25-pel along −X and BVPy is 1.75-pel along +Y, after the clipping operation, BVx is 2-pel along −X and BVy is +2-pel along +Y where BVPx is rounded to the nearest integer and BVPy is rounded to the nearest integer, i.e., 2. Of course, the descriptions with reference to Eqs. (1) and (2) can be suitably adapted to other clipping operations. The final BV can be rounded up or down depending on the embodiment, and in some embodiments may be rounded up or down based on whether a component of BV_pred is along the positive or negative axis. For example, the final BV is rounded toward positive infinity and in one embodiment regardless of whether the component of BV_pred is along the positive or negative axis.

The clipping operations shown in Eqs. (1) and (2) can be performed right after the initial BV is generated, and thus the clipped BV can be used in subsequent operations. For example, the clipped BV of a current block can be used as a candidate to predict another BV for a block decoded after the current block.

Alternatively, the clipping operations shown in Eqs. (1) and (2) can be performed right before motion compensation interpolation. Therefore the fractional-pel initial BV can be used in the BV prediction for other blocks, for example, to predict another BV for a block decoded after the current block. The BV prediction can be performed by signaling an offset similar to the UMVE used for MV prediction or by signaling a BV difference similar to AMVP mode for MV prediction.

In an embodiment, a BV can be predicted based on a BV predictor and a BV difference where the BV difference is a difference between the BV predictor and the BV, similar to the AMVP mode for the MV prediction. The BV predictor and/or the BV difference can have fractional resolution. Accordingly, a clipping operation can be performed on the resulting BV or initial BV. In an embodiment, a fractional part of the final BV can also be clipped to be zero using Eq. (1) where BV_pred refers to the initial BV having a $1/(2^N)$-pel accuracy, and the BV_clipped is the final BV after clipping. In an example, N is 4. Alternatively, the clipping operation can be performed using Eq. (2) where the final BV is rounded to a nearest integer toward positive infinity. Similarly, when the initial BV and the final BV are vectors, the clipping operations shown in Eqs. (1)-(2) can be performed for one or each component of the respective vectors. The clipping operations shown in Eqs. (1)-(2) can be performed right after the initial BV, i.e., BV_pred, is generated. The clipping operations shown in Eqs. (1)-(2) can also be performed right before a motion compensation interpolation. Therefore the fractional-pel initial BV may be used in the BV prediction for other blocks. Of course, any suitable clipping operation can be performed in any suitable order, for example, to improve efficiency of BV prediction.

In an embodiment, a BV candidate in a candidate list can be averaged with another candidate in the candidate list to generate a new BV candidate, such as in a pairwise merge mode, the above clipping operations can also be applied on the new BV candidate. For example, Eqs. (1)-(2) can be applied where the new BV candidate is BV_pred in Eq. (1) or Eq. (2), the new BV candidate can be clipped into a clipped BV, i.e., BV_clipped in Eq. (1) or Eq. (2), using the above methods.

In an embodiment, one or more of the clipping operations described above can be performed without checking whether a BV has a non-zero fractional part (or the BV has a fractional resolution). Alternatively, whether the BV has a non-zero fractional part is determined, for example, by a decoder. Subsequently, when the BV is determined to have a non-zero fractional part, one or more of the clipping operations described above can be performed to clip or round the BV so that the clipped BV has only integer resolution. In an example, whether the BV has a non-zero fractional part can be determined based on how the BV is stored.

Figure 12:
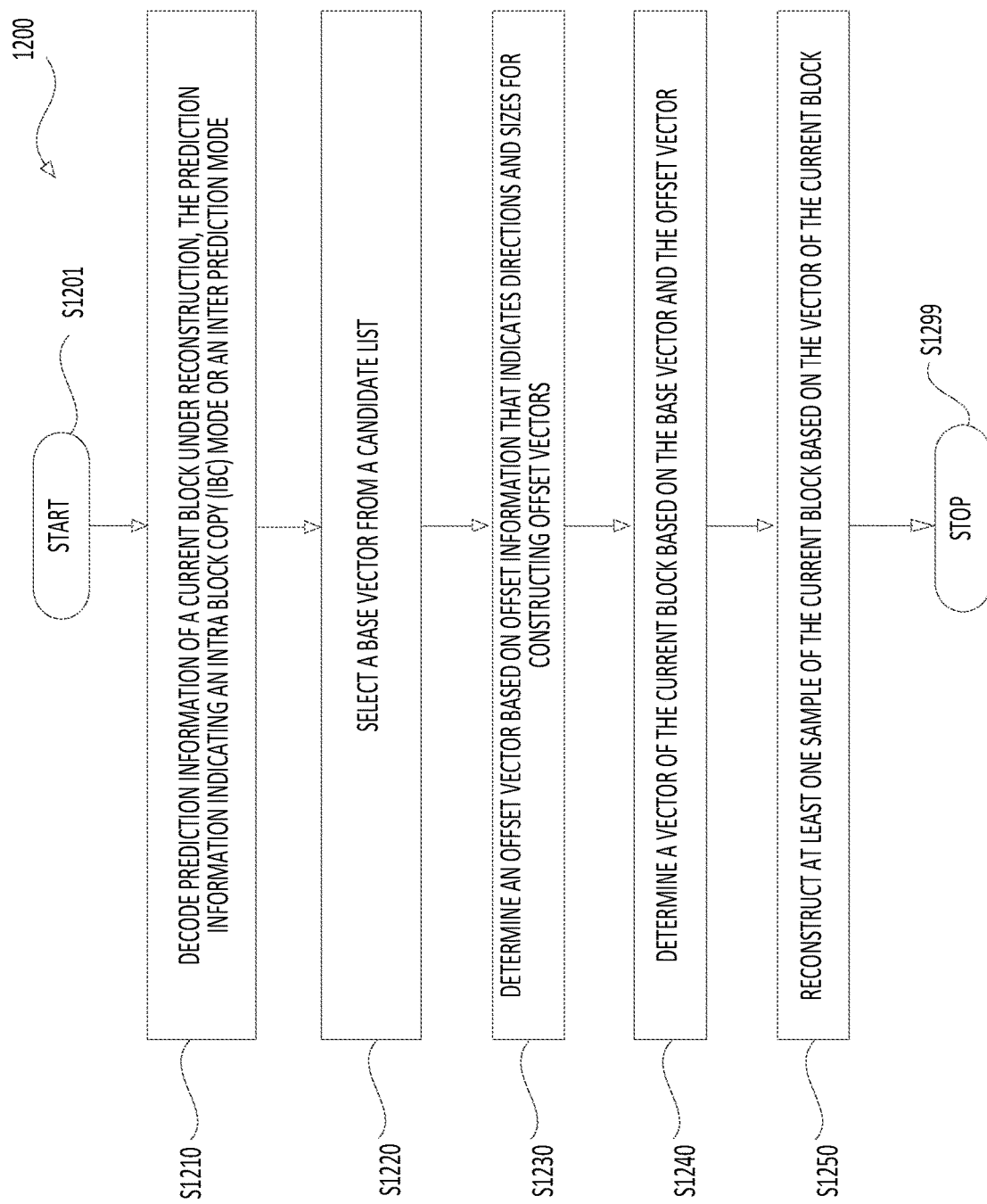
FIG. 12 shows a flow chart outlining a process according to an embodiment of the disclosure.

FIG. 12 shows a flow chart outlining a process (1200) according to an embodiment of the disclosure. The process (1200) can be used in the reconstruction of a current block coded in the IBC mode, the inter prediction mode, or the like so to generate a prediction block for the current block under reconstruction. The current block is in a current picture. In various embodiments, the process (1200) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), the processing circuitry that performs functions of the video encoder (603), the processing circuitry that performs functions of the video encoder (710), and the like. In some embodiments, the process (1200) is implemented in software instructions, thus when the processing circuitry executes the software instructions, the processing circuitry performs the process (1200). The process starts at (S1201) and proceeds to (S1210).

At (S1210), prediction information of the current block is decoded from a coded video bitstream. The prediction information indicates a prediction mode used for reconstructing the current block. The prediction mode can be the IBC mode, the inter prediction mode, or the like.

At (S1220), a base vector or a base predictor can be selected, for example, from a candidate list. When the candidate list includes only one candidate, the base vector can be the candidate and no index is signaled. When the candidate list includes a plurality of candidates, an index, such as a base candidate IDX can be signaled. In the example, the prediction information includes the base candidate IDX. The base vector can be selected based on the base candidate IDX and the candidate list.

In an example, the candidate list includes a BV candidate. The candidate list can also include a MV candidate. For example, the candidate list can be {MVP 1, BV 1, BV 2, MVP 2, MVP 3, . . . } as described above. The base vector can be selected either by including or excluding the BV candidate(s) in the candidate list, as described above. In an example, a BV candidate is selected to be the base vector. In an example, a MV candidate is selected to be the base vector.

At (S1230), an offset vector can be determined based on offset information that indicates directions and/or sizes for constructing offset vectors. The offset information can include indices, such as a distance IDX, an offset direction IDX. The offset information can further include a set of step sizes, a set of offset directions, and the like. The set of step sizes and/or the set of offset directions can be pre-defined in the decoder and includes step sizes and/or offset directions that are available to be used, for example, in the IBC mode for predicting a BV. Examples of sets of offset directions are described with reference to FIGS. 11A-11F. The set of step sizes and/or the set of offset directions can be biased or unbiased. In an example, the prediction information includes the offset information, such as the distance IDX, the offset direction IDX, and/or the like.

In an example, the offset direction of the offset vector can be determined based on the offset direction IDX and the set of offset directions. Further, the magnitude or the step size of the offset vector can be determined based on the distance IDX and the set of step sizes.

At (S1240), a vector of the current block can be determined based on the base vector and the offset vector. In an example, the vector is the vector summation of the base vector and the offset vector. The vector can be a BV, a MV, or the like. The vector can further be clipped or rounded so that the vector has an integer resolution, for example, when the vector is a BV.

At (S1250), at least one sample of the current block is reconstructed according to the vector. In an example, the prediction block is obtained using the vector, and the at least one sample is obtained from the prediction block. In an example, the vector is a BV and the prediction block is in the same current picture. In an example, the vector is a MV, and the prediction block is in a reference picture that is different from the current picture. Then the process (1200) proceeds to (S1299) and terminates.

The process (1200) can be suitably adapted to various scenarios, such as whether to unify the BV prediction that uses an offset vector and the MV prediction that uses an offset vector, whether to include or exclude BV candidates in a candidate list when determining a base predictor, and/or the like.

Figure 13:
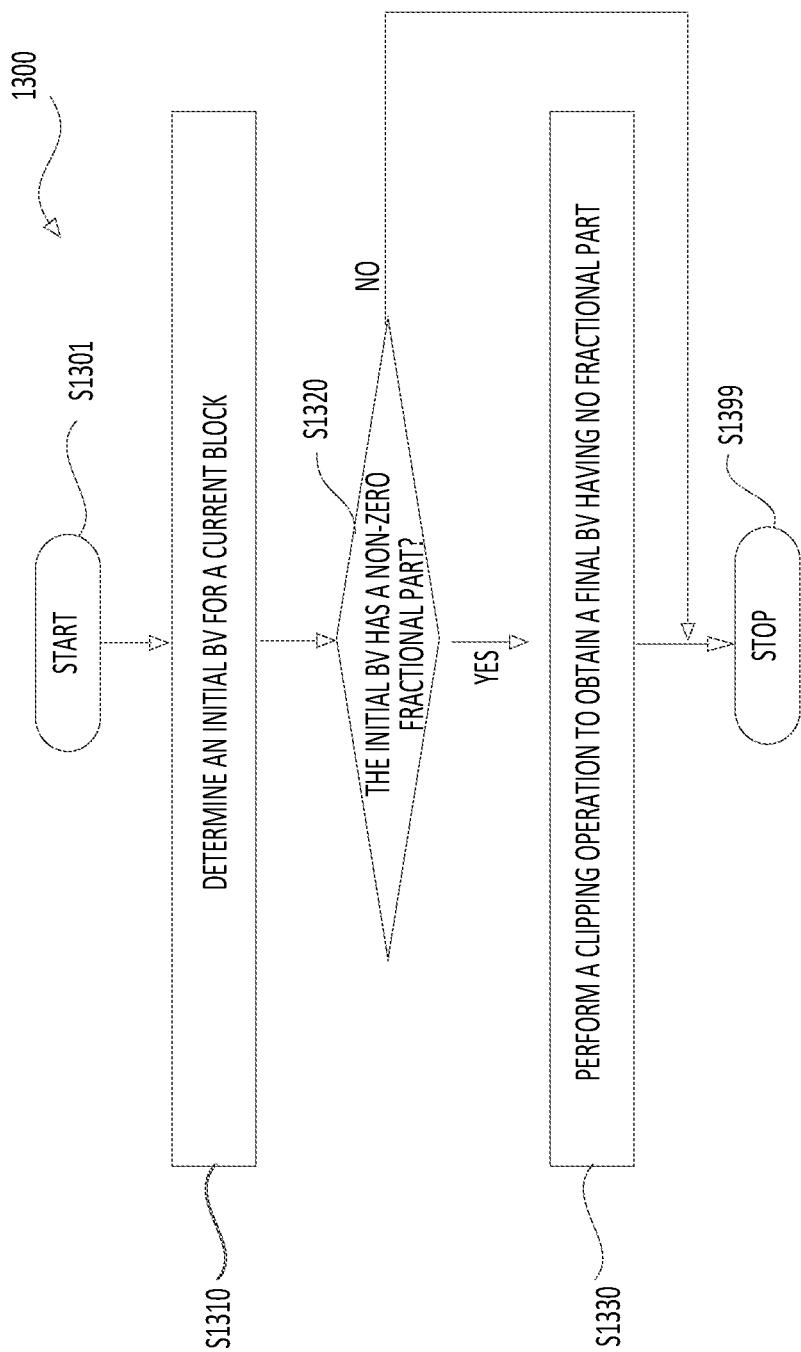
FIG. 13 shows a flow chart outlining a process according to an embodiment of the disclosure.

FIG. 13 shows a flow chart outlining a process (1300) according to an embodiment of the disclosure. The process (1300) can be used to clip or round a BV used in the IBC mode. In various embodiments, the process 1300) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), the processing circuitry that performs functions of the video encoder (603), the processing circuitry that performs functions of the video encoder (710), and the like. In some embodiments, the process (1200) is implemented in software instructions, thus when the processing circuitry executes the software instructions, the processing circuitry performs the process (1300). The process starts at (S1301) and proceeds to (S1310).

At (S1310), an initial BV for a current block can be determined. The initial BV can be obtained using any suitable method, such as those described above.

At (S1320), whether the initial BV has a non-zero fractional part can be determined. When the initial BV is determined to have the non-zero fractional part, i.e., the initial BV has a fractional resolution, the process (1300) proceeds to (S1330). Otherwise, the process (1300) proceeds to (S1399), and terminates.

At (S1330), a clipping operation can be performed to obtain a final BV having no fractional part. In an example, the clipping operation can remove the non-zero fractional part as described in Eq. (1). In an example, the clipping operation can round each component of the initial BV to a nearest integer, as described in Eq. (2). Then the process (1300) proceeds to (S1399) and terminates.

The process (1300) can be suitably adapted to various scenarios and steps in the process (1300) can be adjusted accordingly. For example, (S1320) can be omitted, and thus the clipping operation is performed on the initial BV without checking whether the initial BV has a non-zero fractional part. Additional step(s) can be added. In an example, when multiple clipping operations are available, a step can be added to determine which of the multiple clipping operations is to be used for the initial BV. In an example, a step of predicting a BV for another block based on the initial BV can be added between (S1310) and (S1320), and thus the unclipped initial BV can be used as a BV candidate for the other block.

The processes (1200) and (1300) can be combined in any suitable order or used separately.

The description above illustrates embodiments and examples where an offset vector can be determined based on a distance IDX, an offset direction IDX, a set of offset directions, and a set of step sizes. The description can be suitably adapted to other scenarios. For example, an offset vector can be determined based on a single IDX and a set of selections where each selection can be a combination of an offset direction and a step size. In an example, an offset vector can be determined based on a distance IDX, an offset direction IDX, a set of offset directions, and a set of magnitudes of offset vectors. In an example, an offset vector can be determined based on a first IDX, a second IDX, a set of x components, and a set of y components where an x component of the offset vector is determined based on the first IDX and the set of x components and a y component of the offset vector is determined based on the second IDX and the set of y components.

Any suitable methods and binarization can be used to represent a set of offset directions, a set of step sizes, a set of magnitudes, a set of x components, a set of y components, and the like. A set of offset directions, a set of step sizes, a set of magnitudes, a set of x components, a set of y components, and/or the like can be biased or unbiased. A set of offset directions, a set of step sizes, a set of magnitudes, a set of x components, a set of y components, and/or the like can be pre-defined in an encoder and a decoder, or otherwise be made available to the encoder and the decoder.

Embodiments and examples described in the application can be used separately or combined in any order. Further, the methods, embodiments, and examples disclosed can be implemented by processing circuitry (e.g., one or more processors, ICs, circuits, or the like). In an example, the one or more processors execute a program that is stored in a non-transitory computer-readable medium. The term block may be interpreted as a prediction block, a CB, a CU, or the like.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
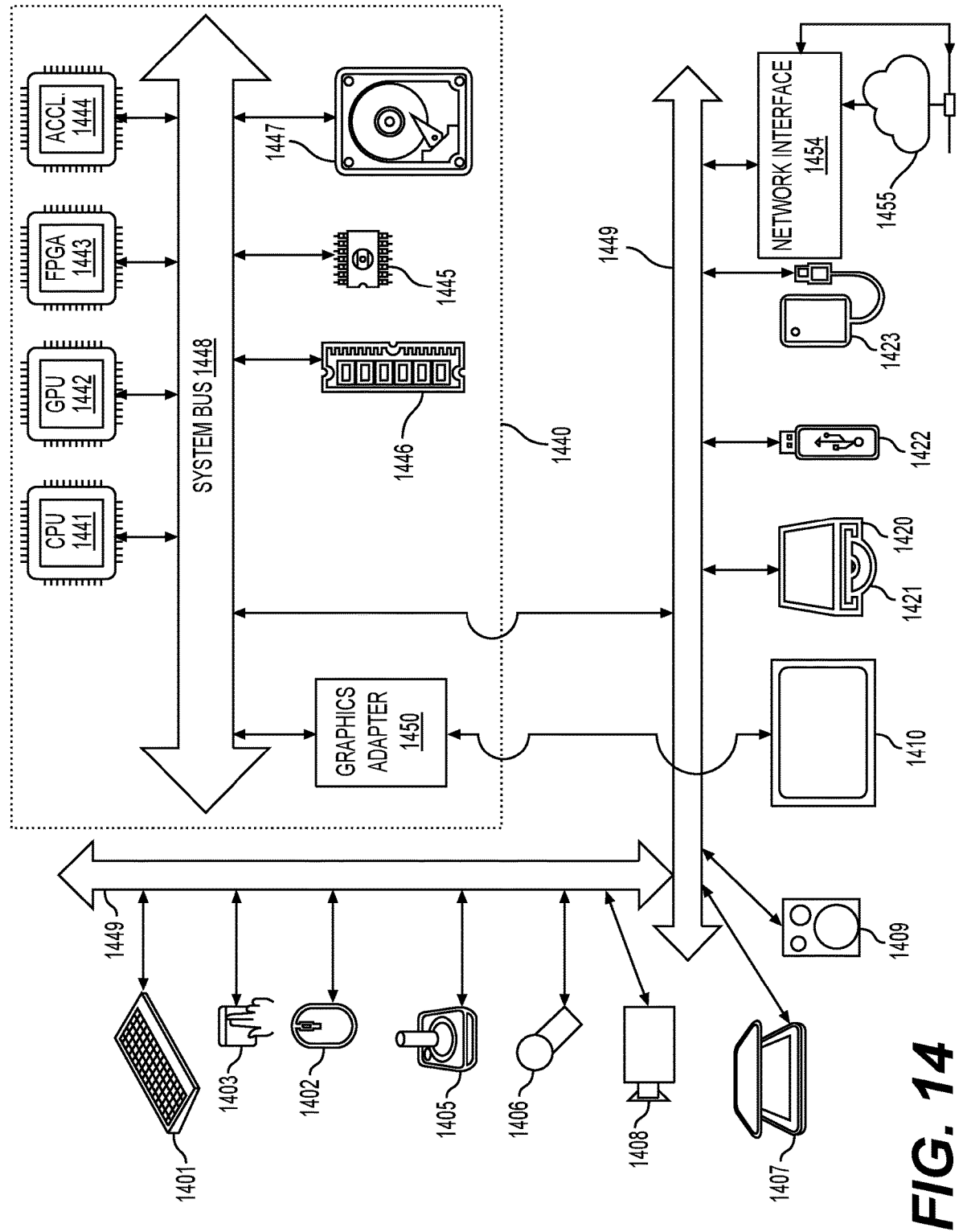
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
CPR: Current Picture Referencing
IBC: Intra Block Copy
SCC: Screen Content Coding
DPB: Decoded Picture Buffer
MVD: Motion Vector Difference
AMVP: Advanced Motion Vector Prediction
UMVE: Ultimate Motion Vector Expression
BV: Block Vector
MV: Motion Vector
MMVD: Merge Mode with Motion Vector Difference While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video coding, comprising:
encoding a video bitstream comprising a current block in a current picture to a coded video bitstream in accordance with formatting rules,
wherein the formatting rules specify a first syntax element indicating a prediction mode for the current block in the current picture is one of: an inter prediction mode and an intra block copy (IBC) mode;
wherein the formatting rules specify a second syntax element indicating a base vector from a candidate list including a motion vector candidate used in the inter prediction mode and a block vector candidate used in the IBC mode;
wherein the formatting rules specify a third syntax element indicating an offset vector based on offset directions and step sizes for constructing offset vectors, wherein the step sizes are biased such that one of the step sizes has a shorter codeword than another one of the step sizes, wherein a motion vector of the current block is a summation of the base vector and the offset vector in response to the prediction mode being the inter prediction mode and a block vector of the current block is a summation of the base vector and the offset vector in response to the prediction mode being the IBC mode; and
wherein the method further includes transmitting the coded video bitstream including prediction information, the prediction information indicating the first syntax element indicating the prediction mode, the second syntax element indicating the base vector, and the third syntax element indicating the offset vector.

2. The method of claim 1, wherein
the prediction mode is the IBC mode,
the candidate list includes the block vector candidate used in the IBC mode, and
the base vector is the block vector candidate.

3. The method of claim 1, wherein the encoding the video bitstream includes:
determining a base index that points to the base vector in the candidate list, the prediction information including the base index.

4. The method of claim 1, wherein the encoding the video bitstream includes:
determining an offset direction index and a distance index to be included in the prediction information, the offset direction index indicating one of the offset directions, the distance index indicating one of the step sizes, the offset vector being indicated by the one of the offset directions and the one of the step sizes.

5. The method of claim 1, wherein the offset directions are biased such that one of the offset directions has a longer codeword than another one of the offset directions or does not have an assigned codeword.

6. The method of claim 5, wherein the offset directions are biased toward a negative direction in one of: an x-axis direction and a y-axis direction.

7. The method of claim 1, wherein each step size in the step sizes is equal to one of (i) one sample size and (ii) multiple sample sizes.

8. The method of claim 1, wherein
the prediction information further indicates a number of the offset directions and a number of the step sizes.

9. The method of claim 8, wherein the offset directions include offset directions for constructing offset vectors for the inter prediction mode and offset directions for constructing offset vectors for the IBC mode and the step sizes include step sizes for constructing the offset vectors for the inter prediction mode and step sizes for constructing the offset vectors for the IBC mode.

10. The method of claim 8, wherein
the offset directions include a separate set of offset directions for constructing offset vectors for the inter prediction mode and a separate set of offset directions for constructing offset vectors for the IBC mode or
the step sizes include a separate set of step sizes for constructing the offset vectors for the inter prediction mode and a separate set of step sizes for constructing offset vectors for the IBC mode.

11. The method of claim 2, further comprising:
clipping the block vector candidate to obtain a clipped block vector, a reference block pointed by the clipped block vector being shifted by one of (i) one sample size and (ii) multiple sample sizes in an x and a y direction.

12. An apparatus for video encoding, comprising:
processing circuitry configured to:
encode a video bitstream comprising a current block in a current picture to a coded video bitstream in accordance with formatting rules,
wherein the formatting rules specify a first syntax element indicating a prediction mode for the current block in the current picture is one of: an inter prediction mode and an intra block copy (IBC) mode;
wherein the formatting rules specify a second syntax element indicating a base vector from a candidate list including a motion vector candidate used in the inter prediction mode and a block vector candidate used in the IBC mode;
wherein the formatting rules specify a third syntax element indicating an offset vector based on offset directions and step sizes for constructing offset vectors, wherein the step sizes are biased such that one of the step sizes has a shorter codeword than another one of the step sizes, wherein a motion vector of the current block is a summation of the base vector and the offset vector in response to the prediction mode being the inter prediction mode and a block vector of the current block is a summation of the base vector and the offset vector in response to the prediction mode being the IBC mode; and
wherein the processing circuitry is further configured to transmit the coded video bitstream including prediction information, the prediction information including the first syntax element indicating the prediction mode, the second syntax element indicating the base vector, and the third syntax element indicating the offset vector.

13. The apparatus of claim 12, wherein
the prediction mode is the IBC mode,
the candidate list includes the block vector candidate used in the IBC mode, and
the base vector is the block vector candidate.

14. The apparatus of claim 12, wherein the processing circuitry is configured to:
determine a base index that points to the base vector in the candidate list, the prediction information including the base index.

15. The apparatus of claim 12, wherein the processing circuitry is configured to:
determine an offset direction index and a distance index to be included in the prediction information, the offset direction index indicating one of the offset directions, the distance index indicating one of the step sizes, the offset vector being indicated by the one of the offset directions and the one of the step sizes.

16. The apparatus of claim 12, wherein the offset directions are biased such that one of the offset directions has a longer codeword than another one of the offset directions or does not have an assigned codeword.

17. The apparatus of claim 16, wherein the offset directions are biased toward a negative direction in one of: an x-axis direction and a y-axis direction.

18. The apparatus of claim 12, wherein each step size in the step sizes is equal to one of (i) one sample size and (ii) multiple sample sizes.

19. The apparatus of claim 13, wherein the processing circuitry is configured to:
   clip the block vector candidate to obtain a clipped block vector, a reference block pointed by the clipped block vector being shifted by one of (i) one sample size and (ii) multiple sample sizes in an x and a y direction.

20. A non-transitory computer-readable storage medium storing instructions which when executed by a processor cause the processor to perform:
   encoding a video bitstream comprising a current block in a current picture to a coded video bitstream in accordance with formatting rules,
   wherein the formatting rules specify a first syntax element indicating a prediction mode for the current block in the current picture is one of: an inter prediction mode and an intra block copy (IBC) mode;
   wherein the formatting rules specify a second syntax element indicating a base vector from a candidate list including a motion vector candidate used in the inter prediction mode and a block vector candidate used in the IBC mode;
   wherein the formatting rules specify a third syntax element indicating an offset vector based on offset directions and step sizes for constructing offset vectors, wherein the step sizes are biased such that one of the step sizes has a shorter codeword than another one of the step sizes, wherein a motion vector of the current block is a summation of the base vector and the offset vector in response to the prediction mode being the inter prediction mode and a block vector of the current block is a summation of the base vector and the offset vector in response to the prediction mode being the IBC mode; and
   wherein the instructions further cause the processor to perform transmitting the coded video bitstream including prediction information, the prediction information including the first syntax element indicating the prediction mode, the second syntax element indicating the base vector, and the third syntax element indicating the offset vector.

* * * * *